US008259619B2

(12) United States Patent
Hasegawa et al.

(10) Patent No.: US 8,259,619 B2
(45) Date of Patent: *Sep. 4, 2012

(54) TOPOLOGY SPECIFYING METHOD AND TOPOLOGY SPECIFYING APPARATUS

(75) Inventors: Yohei Hasegawa, Tokyo (JP); Masahiro Jibiki, Tokyo (JP)

(73) Assignee: NEC Corporation, Tokyo (JE)

( * ) Notice: Subject to any disclaimer, the term of this patent is extended or adjusted under 35 U.S.C. 154(b) by 377 days.

This patent is subject to a terminal disclaimer.

(21) Appl. No.: 12/600,675

(22) PCT Filed: Apr. 28, 2008

(86) PCT No.: PCT/JP2008/058190
§ 371 (c)(1),
(2), (4) Date: Dec. 11, 2009

(87) PCT Pub. No.: WO2008/142961
PCT Pub. Date: Nov. 27, 2008

(65) Prior Publication Data
US 2010/0150029 A1   Jun. 17, 2010

(30) Foreign Application Priority Data
May 18, 2007   (JP) .................... 2007-132312

(51) Int. Cl.
H04L 12/28   (2006.01)
(52) U.S. Cl. ........................................ 370/255
(58) Field of Classification Search .......... 370/254–256, 370/351, 389
See application file for complete search history.

(56) References Cited

U.S. PATENT DOCUMENTS

| | | | | |
|---|---|---|---|---|
| 6,097,696 A * | 8/2000 | Doverspike | ................ | 370/216 |
| 6,256,295 B1 * | 7/2001 | Callon | ................ | 370/254 |
| 6,496,859 B2 * | 12/2002 | Roy et al. | ................ | 709/223 |
| 6,515,624 B1 * | 2/2003 | Roesler et al. | ................ | 342/453 |
| 7,818,795 B1 * | 10/2010 | Arad | ................ | 726/13 |
| 2002/0131424 A1 * | 9/2002 | Suemura | ................ | 370/400 |
| 2007/0195799 A1 * | 8/2007 | Kanazawa et al. | ................ | 370/401 |
| 2008/0198769 A1 * | 8/2008 | Tzeng | ................ | 370/256 |
| 2011/0216673 A1 * | 9/2011 | Hasegawa et al. | ................ | 370/256 |

FOREIGN PATENT DOCUMENTS

| | | |
|---|---|---|
| JP | 9-186716 A | 7/1997 |
| JP | 2002252625 A | 9/2002 |
| JP | 2006019866 A | 1/2006 |

OTHER PUBLICATIONS

International Search Report for PCT/JP2008/058190 mailed Jun. 3, 2008.

* cited by examiner

*Primary Examiner* — Anh-Vu Ly
*Assistant Examiner* — Omar Ghowrwal

(57) ABSTRACT

A topology specifying apparatus 10 according to this invention includes, in a network having a tree type network topology, a route overlap determining section 4 configured to determine existence or non-existence of an overlap between a first route to a terminal having an unknown connection node and a second route between terminals having known connection nodes; and a topology specifying section 5 configured to determine a network topology based on the existence or non-existence of the overlap of the first route and the second route.

10 Claims, 20 Drawing Sheets

```
# TERMINALS CONNECTED TO SWITCH
SW31 (50, 51, 53, .... 5n)
SW32 (52, 90)
# INTER-SWITCH CONNECTION
SW31-SW32
```

TOPOLOGY SPECIFYING METHOD AND TOPOLOGY SPECIFYING APPARATUS

This patent application is the National Phase of PCT/JP2008/058190, filed Apr. 28, 2008, which claims a priority on convention based on Japanese Patent Application No. 2007-132312, and the disclosure thereof is incorporated herein by reference.

TECHNICAL FIELD

The present invention relates to a determining method of a network topology (a connection relation between terminals and a switch in a network) and an apparatus thereof.

BACKGROUND ART

In recent years, in order to specify a failure portion on a network for a network management, it is often necessary to know a connection relation (a network topology: hereinafter, to be referred to as a topology) between terminals and a switch on the network. A network managing function is typically provided for an IP (Internet Protocol) router used for the Internet in many cases, and is used to determine the topology easily. On the other hand, in LAN (Local Area Network) defined in IEEE802.3 (Ethernet (Registered Trademark)), inexpensive switches are used in many cases. The managing function for specifying the topology is not provided for the switches, and therefore, it is generally difficult to determine the topology. As the conventional techniques for specifying the topology in the LAN, the following methods are known.

As a first conventional technique, a method is typically known of collecting connection data from the switches and determining the topology based on the collected data. The first conventional technique is described in, for example, Japanese Patent Application Publication (JP-A-Heisei, 9-186716), in which each of the switches in the network collects the addresses of the terminals connected to each of interfaces of the switch and the other switches and determines the topology.

As a second conventional technique, a method is known of sequentially inspecting routers/switches on a route between terminals and determining the topology. Conventionally, it is typically known that the topology can be estimated by using a function of sequentially specifying the routers on the route between the terminals, by using Traceroute in an IP level. On the other hand, in the Ethernet (registered trademark), a function of acquiring a response of a frame in the switch has been standardized as IEEE802.1ag, similarly to the Traceroute. Thus, the method similar to the Traceroute can be used to easily estimate the topology.

As a third conventional technique, a method is known in which a packet is transmitted from a certain terminal to a plurality of other terminals, and a correlation between qualities (throughputs, delays, and packet losses) acquired by the packet in the network is inspected to determine the topology in each of the terminals receiving this packet.

However, in the first and second conventional techniques, when a network equipment that does not have a managing function to specify the topology exists in the network, the topology of the portion related to the equipment cannot be specified. In particular, the LAN is typically provided with inexpensive switches with no managing function. The inexpensive switches cannot use the managing function and the IEEE802.1ag in many cases. Thus, it is difficult to specify the topology in the LAN of the typical (inexpensive) configuration.

Also, in the third conventional technique, in order to specify the topology, a topology specifying function is required to be provided for each of the terminals in the network. Thus, the cost increases when the network is configured in which the topology can be specified.

DISCLOSURE OF THE INVENTION

Therefore, an object of the present invention is to provide a topology specifying method and a topology specifying apparatus that can specify a topology without providing a special topology specification function for each of switches in a network.

A topology specifying method according to the present invention in a network having a tree type network topology, includes selecting a first route between a first terminal and a second terminal and a second route between a third terminal and a fourth terminal; and determining a network topology based on existence or non-existence of an overlap of the first route and the second route.

Preferably, the determining the existence or non-existence of the overlap between the routes includes: selecting a known network topology which includes the first terminal, the third terminal, and the fourth terminal; and extracting the second terminal having an unknown connection position with the known network topology as an unknown terminal. At this time, the determining a network topology includes: specifying the connection position of the unknown terminal with the known network topology based on the existence or non-existence of the overlap of the first route and the second route.

Also, in the known network topology, the first terminal, the third terminal, and the fourth terminal are connected with a first switch through different networks, respectively. At this time, the determining a network topology includes: specifying a network between the first switch and the unknown terminal based on the existence or non-existence of the overlap of the first route and the second route.

The determining a network topology includes: determining that the unknown terminal is connected with the first switch through the network between the first switch and the first terminal when the first route and the second route do not overlap.

On the other hand, the determining a network topology includes: determining that the unknown terminal is connected with the first switch through the network other than the network between the first switch and the first terminal when the first route and the second route overlap.

Also, the determining a network topology preferably includes: determining that the unknown terminal is connected with the first switch through a new network when the unknown terminal is determined not to be connected with any of the networks connected with the first switch in the known network topology.

The topology specifying method is preferable to further include determining the existence or non-existence of the overlap of the first route and the second route. The determining the existence or non-existence of the overlap according to a first exemplary example, includes: controlling a switch on the first route to learn to transfer a frame destined to a predetermined terminal to the first terminal; controlling a switch on the second route to learn to transfer a frame destined to the predetermined terminal to the third terminal; transmitting a frame destined to the predetermined terminal from the fourth terminal; and determining the existence or non-existence of the overlap of the first route and the second route based on receiving terminals of the frame destined to the predetermined terminal. Under this condition, when the frame destined to the predetermined terminal is received by the first terminal, it is determined that the first route and the second route overlap. Also, when the frame destined to the predetermined terminal is received by the third terminal, it is determined that the first route and the second route do not overlap.

The determining the existence or non-existence of the overlap according to a second example includes: controlling a switch on the first route to learn to transfer a frame destined to the third terminal to the first terminal; transmitting a frame destined to the third terminal from the fourth terminal; and determining the existence or non-existence of the overlap of the first route and the second route based on whether the first terminal receives the frame destined to the third terminal.

A topology specifying apparatus in a network having a tree type network topology according to the present invention, includes: a route overlap determining section configured to determine existence or non-existence of an overlap between a first route between a first terminal and a second terminal and a second route between a third terminal and a fourth terminal; and a topology specifying section configured to determine a network topology based on the existence or non-existence of the overlap of the first route and the second route. The route overlap determining section selects a known network topology which includes the first terminal, the third terminal, and the fourth terminal, and extracts the second terminal having an unknown connection position with the known network topology as an unknown terminal. The topology specifying section specifies the connection position of the unknown terminal with the known network topology based on the existence or non-existence of the overlap of the first route and the second route.

The topology specifying apparatus according to a first example further includes: a measurement frame transmitting and receiving section configured to transmit a first frame having an address of a predetermined terminal as a transmission source address to the second terminal. The route overlap determining section requests the third terminal to transmit a second frame having the address of the predetermined terminal as a transmission source address to the fourth terminal. Then, the route overlap determining section determines that the first route and the second route overlap, when the measurement frame transmitting and receiving section receives a third frame destined to the predetermined terminal transmitted from the fourth terminal.

The topology specifying apparatus according to a second example further includes: a measurement frame transmitting and receiving section configured to transmit a fourth frame having an address of the third terminal as a transmission source address to the second terminal. The route overlap determining section transmits a PING (Packet InterNet Groper) request from the third terminal to the fourth terminal. Then, the route overlap determining section determines that the first route and the second route overlap, when the measurement frame transmitting and receiving section receives a response frame to the PING request.

As mentioned above, according to the topology specifying method and the topology specifying apparatus according to the present invention, it is possible to specify the topology even if all of the switches in the network do not have the special function for topology specification.

BRIEF DESCRIPTION OF THE DRAWINGS

The objects, effects and features of the present invention will become from the descriptions of the exemplary embodiments in conjunction with the attached drawings.

BEST MODE FOR CARRYING OUT THE INVENTION

Figure 1:
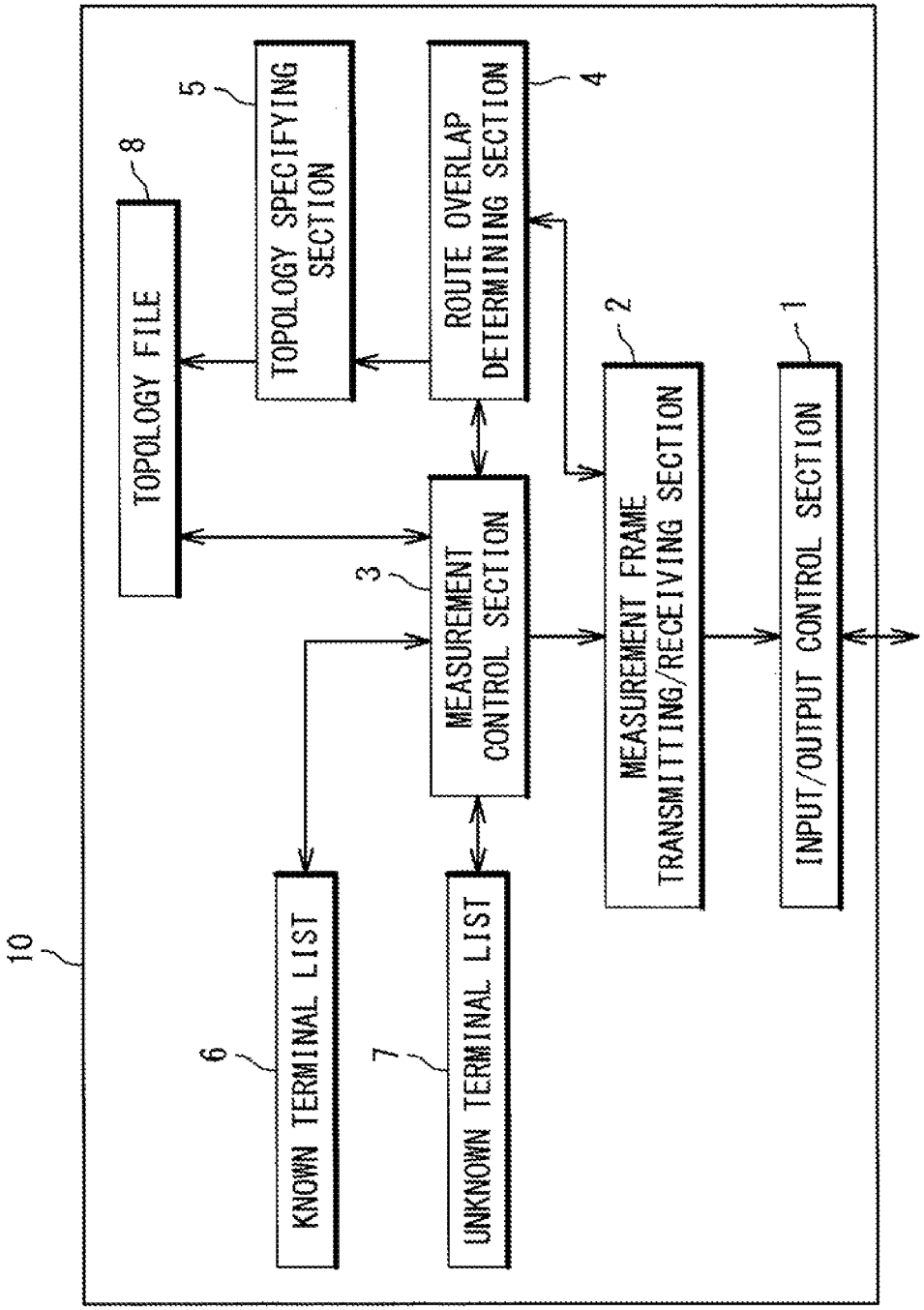
FIG. 1 is a block diagram showing a configuration of a topology specifying apparatus according to a first exemplary embodiment of the present invention.
Figure 2A:
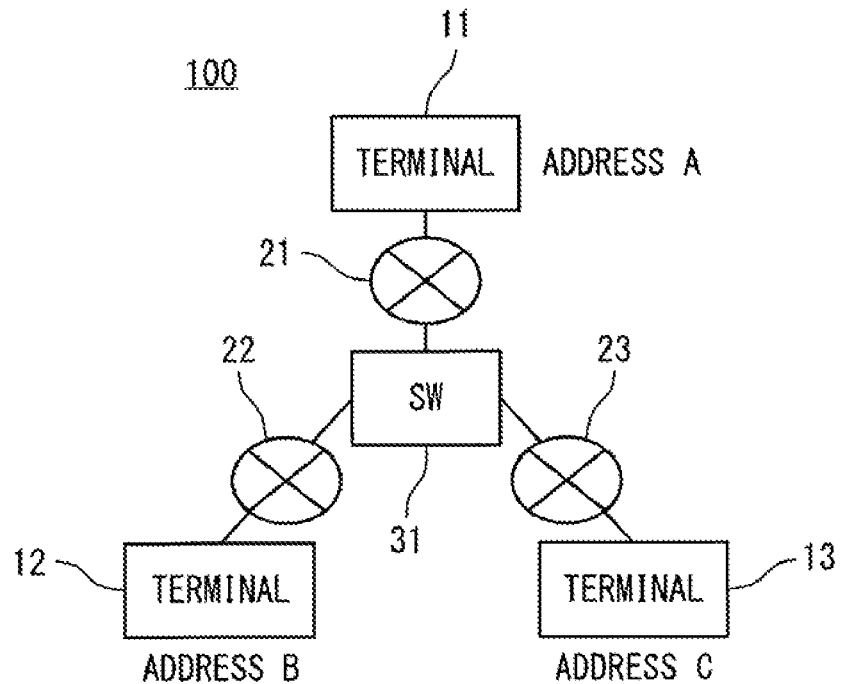
FIG. 2A is a diagram showing a known topology that is used in topology specification in the first exemplary embodiment.

Hereinafter, a topology specifying method and a topology specifying apparatus according to the present invention will be described with reference to the attached drawings. In the following exemplary embodiments, a method of specifying a topology in a LAN that contains a switch compatible to IEEE802.1 will be described as an example. An IEEE802.1 network has a topology of a tree type, in which a loop does not exist in the network (typically, even if a loop exists physically, a topology of a tree type is logically configured). Such a network can be always represented by a topology in which when switches having no influence on route branches are omitted, three terminals (terminals 11, 12 and 13) are connected to one switch (switch 31), as shown in FIG. 2A. In the topology specifying method according to the present invention, a set of (two) routes are extracted from a known topology, in which the three terminals and an unknown terminal are provided, and a connection node can be specified between the unknown terminal and the known topology by verifying whether or not the set of routes includes a common switch. Hereinafter, a case that the set of routes includes the common switch is represented as "overlap of the routes". Also, the switch corresponding to the standard IEEE802.1 learns a transfer direction of a frame in accordance with a transmission source address of the frame, and determines the transfer direction of the frame in accordance with a destination address of the frame. For this reason, in the present invention, the switch is controlled to learn the transfer direction different from a normal operation, and consequently the existence or non-existence of overlap of the routes is verified. The detail will be described later.

1. First Exemplary Embodiment

The topology specifying method and topology specifying apparatus according to a first exemplary embodiment of the present invention will be described below with reference to FIGS. 1 to 11B. In the first exemplary embodiment, a method of specifying a topology in which four terminals 11, 12, 13 and 90 are provided in a LAN will be described as an example. Here, it is assumed that the topology of the network including the three terminals 11, 12 and 13 shown in FIG. 2A is known (hereinafter, to be referred to as a known topology 100), and a terminal 90 is not specified in a connection relation with the known topology 100. With reference to FIG. 2A, the terminals 11, 12 and 13 are connected to the switch 31 through network 21, 22 and 23, respectively. It should be noted that only one switch 31 is present in the tree type network in which the switch is connected to respective terminals through different interfaces. Also, it is assumed that the respective terminals and MAC addresses are related to each other in advance in the switch 31 and the respective terminals can communicate with each other.

Here, each of the terminals (terminals 11, 12, 13 and 90) in the LAN in the first exemplary embodiment contains a topology specifying apparatus 10. The topology specifying apparatus 10 contains an input/output control section 1, a measurement frame transmitting/receiving section 2, a measurement control section 3, a route overlap determining section 4 and a topology specifying section 5. Also, the topology specifying apparatus 10 contains a storing unit (not shown) in which a known terminal list 6, an unknown terminal list 7 and a topology file 8 are stored. The input/output control section 1 controls the inputs and outputs of the frame/packet to/from the network. The measurement frame transmitting/receiving section 2 generates and transmits/receives a measurement frame for inspecting route overlap. The measurement control section 3 manages a measuring procedure to be described later, and instructs a different measurement terminal to notify transmission of a frame and a reception result. The route overlap determining section 4 determines overlap between routes in accordance with the reception result of the measurement frame. The topology specifying section 5 determines topology from data of the route overlap and updates a known topology 100 written in the topology file 8.

Figure 2B:
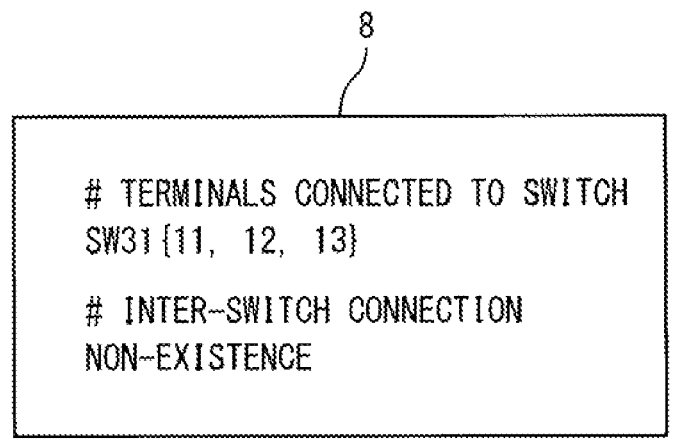
FIG. 2B is a diagram showing a topology file based on the topology shown in FIG. 2A.

A list of known terminals and switches, which are included in the known topology 100, is recorded in the known terminal list 6. Here, the terminals 11, 12 and 13 and the switch 31 are recorded in the known terminal list 6. A list of terminals, whose connection positions are unknown although their existence in the network is known is recorded in the unknown terminal list 7. Here, the terminal 90 is recorded in the unknown terminal list 7. The known topology 100 is recorded in the topology file 8. Here, as the topology file 8, the configuration members representative of the known topology 100 shown in FIG. 2A and the connection relation between the respective configuration members are recorded as shown in FIG. 2B. For example, the terminal names for each switch and a connection state between the switches (the existence or non-existence of the connection between the switches and the names of connected switches) are recorded in the topology file 8.

The topology specifying method according to the present invention will be described below. Hereinafter, for the sake of convenience, the address (IP address, MAC address) of the terminal 11 is defined as A, and the respective addresses of the terminals 12 and 13 are similarly defined as B and C. Also, in this exemplary embodiment, it is assumed that the terminal 11 functions as a host terminal for determining the route overlap and issues various instructions to the terminals 12 and 13. Moreover, the terminals 11, 12 and 13 are assumed to be registered as 11, 12 and 13 in the known terminal list 6 of the terminal 11, respectively.

Figure 3:
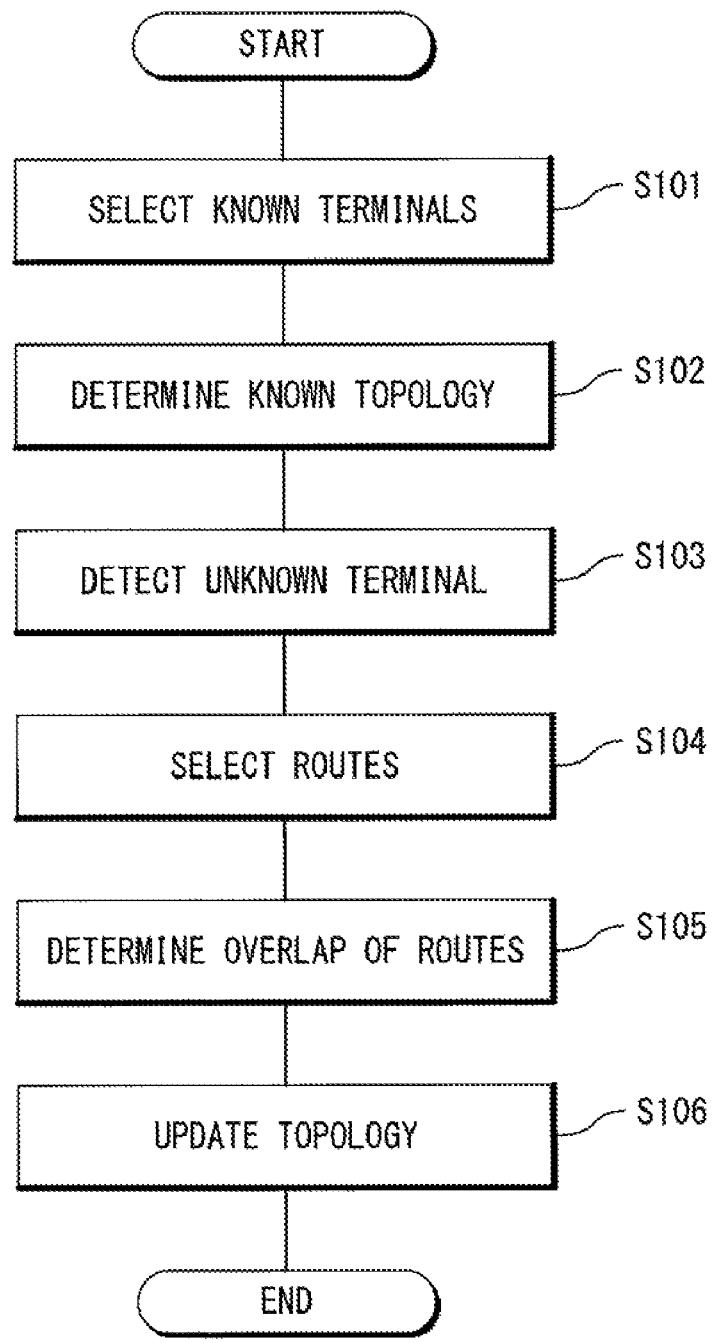
FIG. 3 is a flowchart showing an outline of a topology specifying method according to the present invention.
Figure 4:
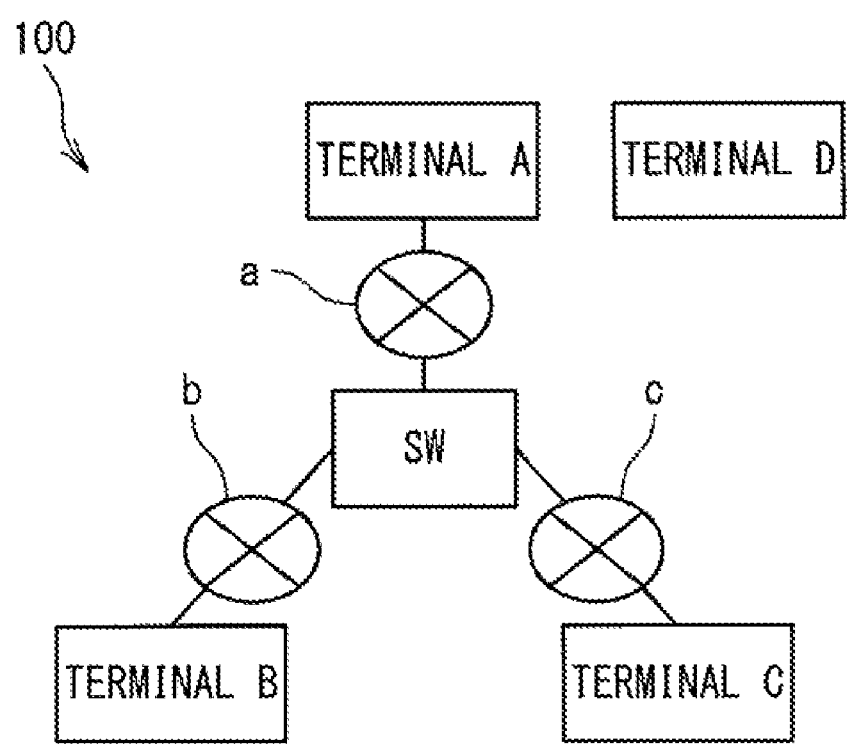
FIG. 4 is a diagram showing the known topology and a terminal whose connection position is unknown, which are used to specify a topology in the first exemplary embodiment.

At first, the outline of the topology specifying method will be described with reference to FIGS. 3 and 4. The terminal 11 determines the known topology 100 that includes the three terminals A, B and C connected to the switch SW as shown in FIG. 4 (Steps S101, S102), and extracts an unknown terminal D from the unknown terminal list 7 (Step S103). The terminal 11 specifies a connection position (node) of the unknown terminal D to the known topology 100 in accordance with the existence or non-existence of the overlaps between each of the terminals A, B and C and the unknown terminal D in the known topology 100, and determines a new topology (Steps S104 to S106). Hereinafter, a route between the terminal A and the terminal B is represented as a route AB, a route between the terminal A and the terminal C is represented as a route AC, a route between the terminal A and the terminal D is represented as a route AD, a route between the terminal B and the terminal C is represented as a route BC, a route between the terminal B and the terminal D is represented as a route BD, and a route between the terminal C and the terminal D is represented as a route CD.

A specific example of the topology specifying method will be described below with reference to FIGS. 2A to 4. The measurement control section 3 in the terminal 11 selects the terminal 11, which is a self-terminal, and other two optional terminals from the known terminal list 6 (Step S101). Here, the terminal 11, the terminal 12 and the terminal 13 are selected as the terminals A, B and C, respectively. Next, the terminal 11 uses the selected terminals to determine the known topology 100 (Step S102). In detail, the measurement control section 3 of the terminal 11 sends a list of the three terminals to the topology specifying section 5 and requests topology generation. When the topology file 8 is empty, the topology specifying section 5 defines the switch 31 as the switch SW connected to the three terminals 11, 12 and 13, and then determines the known topology 100 shown in FIG. 2A. The topology specifying section 5 records the data representing the determined known topology 100 in the topology file 8. Here, when the known topology exists in the topology file 8, the steps S101, S102 are omitted.

Next, the measurement control section 3 in the terminal 11 determines whether any unknown terminal has been stored in the unknown terminal list 7. If it has been stored, the measurement control section 3 extracts the unknown terminal, and the control flow proceeds to a route selecting process (Step S104) (Step S103). Here, if no terminal has been stored in the known terminal list 6, the control flow is ended. In this exemplary embodiment, since the terminal 90 exists in the unknown terminal list 7, the terminal 90 is selected as the unknown terminal D, and the control flow proceeds to the step S104.

In order to determine the position of the terminal 90, the terminal 11 selects routes that can be attained between the terminals 11, 12, 13 and 90 and then checks the overlap between two routes (Steps S104, S105). The route overlap determining section 4 in the terminal 11 selects a set of routes of a measurement target from the plurality of routes (Step S104). Here, the route overlap determining section 4 selects the set of one route between one unknown terminal and the known terminal and one route between the other known terminals. As such a route set, there are the following three sets: that is, a set (1) of the route AD (between the terminal 11 and the terminal 90) and the route BC (between the terminal 12 and the terminal 13), the set (2) of the route AC (between the terminal 11 and the terminal 13) and the route BD (between the terminal 12 and the terminal 90), and the set (3) of the route AB (between the terminal 11 and the terminal 12) and the route CD (between the terminal 13 and the terminal 90). When a set of the routes as the measurement target is determined, the measurement frame transmitting/receiving section 2 in the terminal 11 transmits and receives the data to and from each of the other terminals 12, 13 and 90. At this time, the route overlap determining section 4 in the terminal 11 determines the existence or non-existence of the overlap in the route set in accordance with the data from the other terminals.

The topology specifying section 5 in the terminal 11 specifies a connection node between the unknown terminal 90 and the known topology 100 on the basis of the overlap determination results of the respective sets and generates a new known topology 100 (Step S106). In detail, if there is the set of the routes that do not overlap, the topology specifying section 5 determines that an unknown switch exists in the direction of the terminal by which the route is formed together with the unknown terminal 90 and that the two terminals are connected to the switch. Also, if all of the sets of the routes overlap, the unknown terminal 90 is determined to be connected through an unknown link with the switch 31. The topology specifying section 5 updates the topology file 8 in accordance with the new known topology 100. Also, the topology specifying section 5 may transfer the updated topology file 8 to the other terminals 12, 13 and 90.

Figure 5:
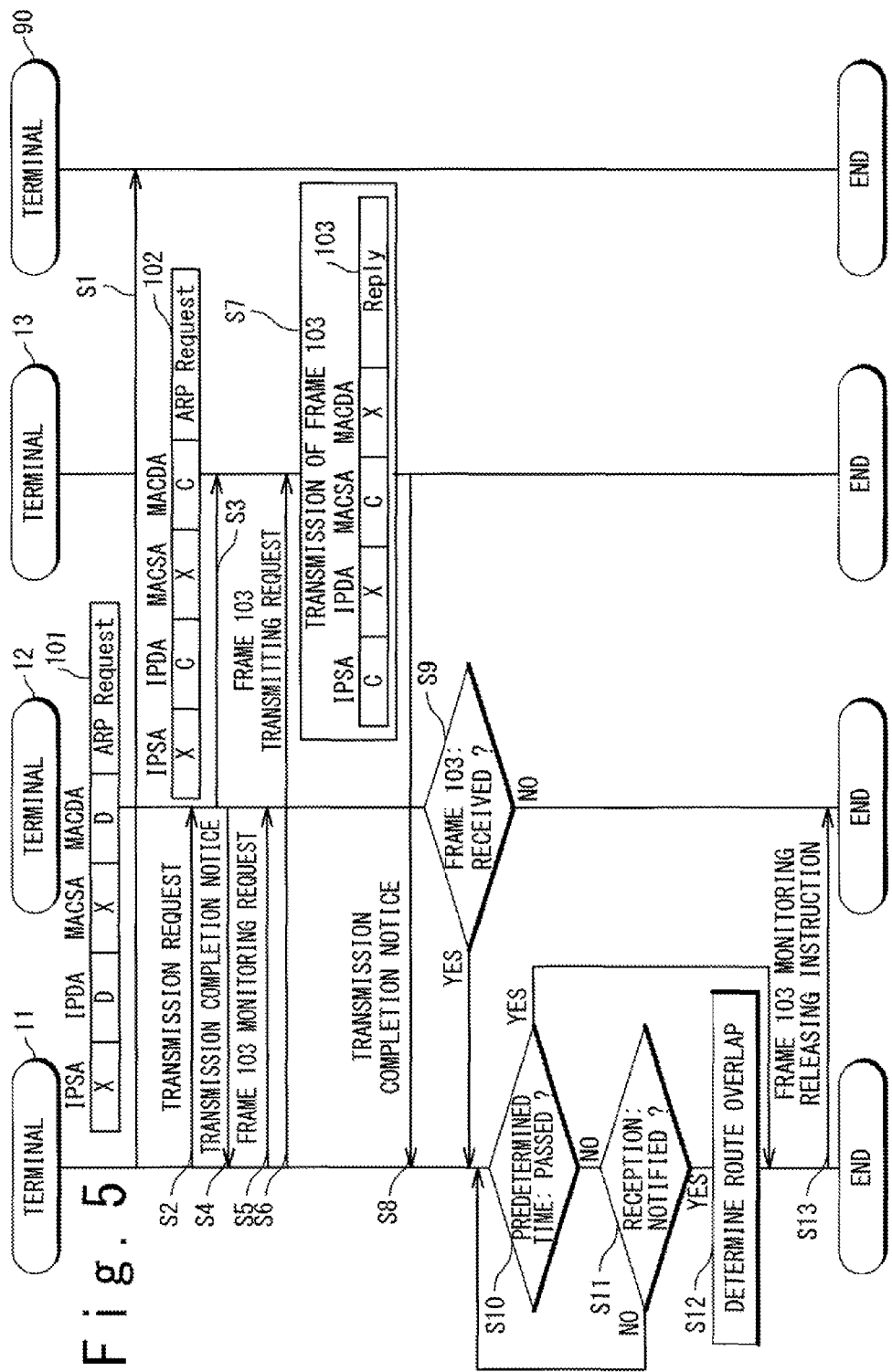
FIG. 5 is a sequence diagram showing an operation of checking an overlap state between routes in a network according to the first exemplary embodiment of the present invention.
Figure 6:
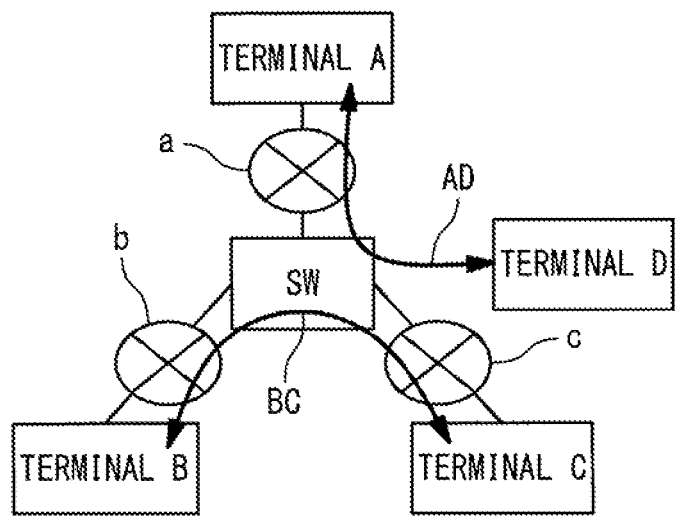
FIG. 6 is a diagram showing a case that a route AD and a route BC overlap.
Figure 7:
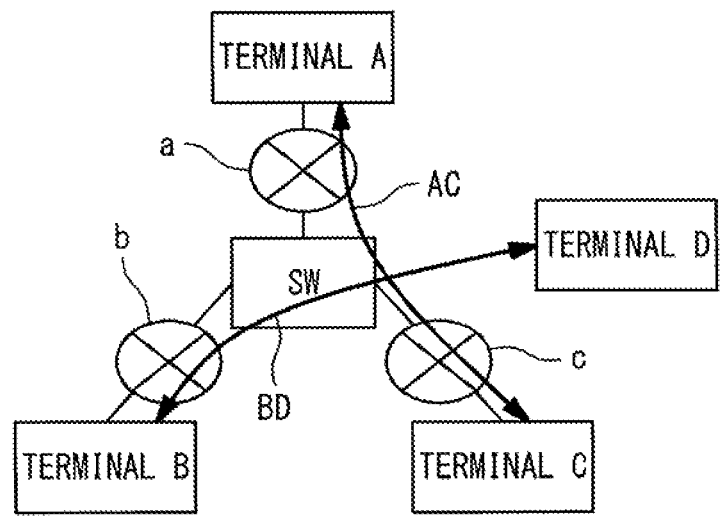
FIG. 7 is a diagram showing a case that a route AC and a route BD overlap.
Figure 8:
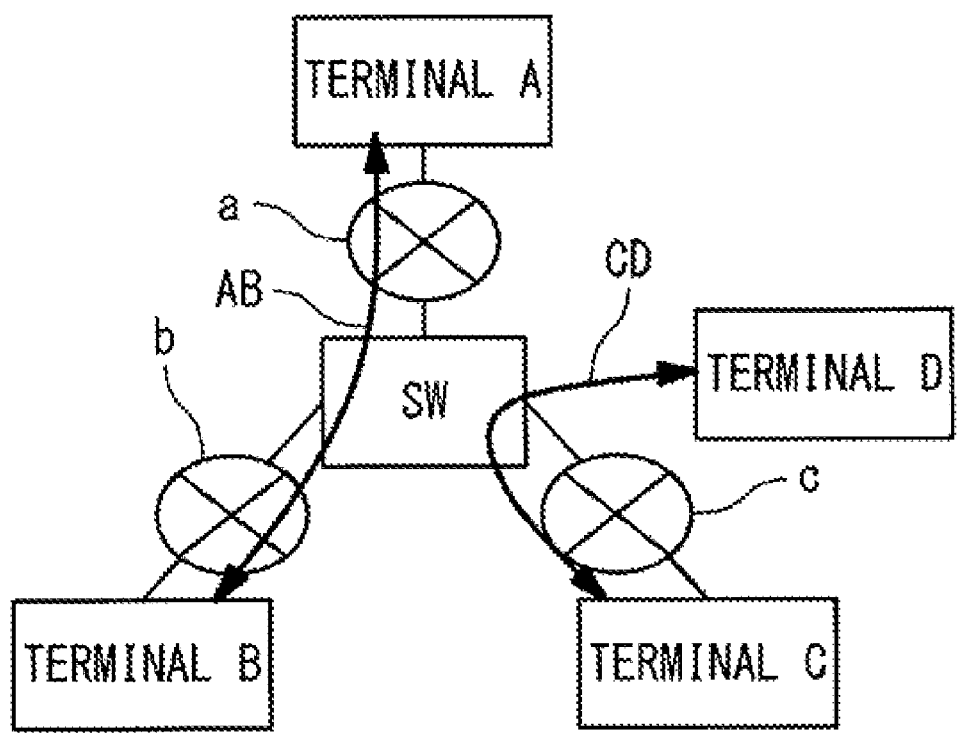
FIG. 8 is a diagram showing a case that a route AB and a route CD overlap.

Referring to FIGS. 5 to 11B, the overlap determining process of the route at the step S105 will be described below in detail. Here, as one example, the method will be described of determining the overlap between the route AD between the terminal 11 and the terminal 90 and the route BC between the terminal 12 and the terminal 13. FIG. 5 is a sequence diagram showing the operation of the overlap determining process between the route AD and the route BC in the first exemplary embodiment.

In the topology specifying method in the first exemplary embodiment, the terminal 11 instructs a switch on the route AD and a switch on the route BC to learn MAC addresses to be measured. In this state, the terminal 11 instructs the terminal 13 to transmit a measurement frame to the terminal 12 and determines the existence or non-existence of the overlap between the route AD and the route BC on the basis of the reception destination of the frame. This process will be described below in detail.

Referring to FIG. 5, the route overlap determining section 4 in the terminal 11 requests the measurement frame transmitting/receiving section 2 to transmit a measurement frame 101 to the terminal 90 (Step S1). Here, the frame 101 is a frame including a unicast ARP (Address Resolution Protocol) request, and a measuring address X is set as the transmission source address (IP address, MAC address), and an address D of the terminal 90 is set as a destination address (IP address, MAC address). Consequently, when the switch exists on the route AD from the terminal 11 to the terminal 90, this switch learns to transfer the frame having a measurement address X as a destination into the direction of the terminal 11.

Next, the route overlap determining section 4 in the terminal 11 issues a transmission request of the frame to the terminal 12, to set the measurement address X in the switch on the route BC (Step S2). The measurement control section 3 in the terminal 12 transmits a frame 102 to the terminal 13 in response to the transmission request from the terminal 11 (Step S3). Here, the frame 102 is a frame including a unicast ARP request, and the measurement address X is set as the transmission source address (IP address, MAC address), and an address C of the terminal 13 is set as the destination address (IP address, MAC address). Consequently, the switch 31 on the route from the terminal 12 to the terminal 13 learns to transfer the frame having the measurement address X as the destination into the direction of the terminal 13.

The terminal 12 issues a transmission completion notice of the frame 102 to the terminal 11 (Step S4). When receiving the transmission completion notice, the route overlap determining section 4 in the terminal 11 issues a frame monitoring request to the terminal 12 (Step S5). In accordance with a frame monitoring request, when receiving a frame 103, the terminal 12 is controlled to notify its fact to the terminal 11. At this time, the route overlap determining section 4 similarly issues a frame monitoring request to the measurement frame transmitting/receiving section 2. In accordance with the frame monitoring request, when receiving the frame 103, the measurement frame transmitting/receiving section 2 in the terminal 11 is controlled to notify its fact to the terminal 11.

In succession, the route overlap determining section 4 in the terminal 11 issues a frame transmitting request to the terminal 13 to transmit the frame 103 addressed to the measurement address X (Step S6). The measurement control section 3 in the terminal 13 sends the frame 103 in response to the frame transmitting request from the terminal 11 and reports a transmission completion to the terminal 11 (Steps S7 and S8).

Then receiving the frame 103, the terminal 12 notifies the reception of the frame 103 to the terminal 11 (Step S9, Yes). Also, the terminal 12 monitors the reception of the frame 103 until a monitor releasing instruction is issued by the terminal 11.

The route overlap determining section 4 in the terminal 11 receives a reception report of the frame 103 within a predetermined period after the reception of the transmission completion notice at the step S8 (Step S10 No, S11). If the reception report is supplied within this period (Step S10 No, S11 Yes), the route overlap determining section 4 in the terminal 11 specifies the terminal receiving the frame 103 in accordance with a report source of the reception, and determines the overlap between the routes (Step S12). On the other hand, if the reception report is not received within the predetermined period, the terminal 11 ends the overlap determining process and issues a frame monitoring releasing instruction to the terminal 12 and the measurement frame transmitting/receiving section 2 (Step S10 Yes, Step S13).

At the step S11, the route overlap determining section 4 in the terminal 11 determines that the route AD between the terminal 11 and the terminal 90 and the route BC between the terminal 12 and the terminal 13 overlap when receiving the reception report of the frame 103 from the measurement frame transmitting/receiving section 2. On the other hand, the route overlap determining section 4 in the terminal 11 determines that the route AD and the route BC do not overlap, when receiving the reception report of the frame 103 from the terminal 12.

The route overlap determining section 4, after sending the result of the overlap determination to the topology specifying section 5, issues a frame monitoring releasing instruction to the terminal 13 and the measurement frame determining section 3 (Step S13). The measurement frame determining sections 3 in the terminal 13 and the terminal 11 stop monitoring the frame 103 in response to the frame monitoring releasing instruction. It should be noted that the frame monitoring processes of the measurement frame determining sections 3 in the terminal 13 and the terminal 11 may be set to be released in a predetermined period.

As mentioned above, it is possible to determine the existence or non-existence of the overlap between the route AD and the route BC. Similarly, it is possible to determine the existence or non-existence of any overlap in the other route sets. According to the present invention, by using the MAC address learning function that is typically used in the switch, it is possible to know the overlap of the routes between the terminal 90 and the known terminals 11, 12 and 13. It should be noted that the transfer of the data from the respective terminals is controlled by the terminal 11 as a host terminal. However, the control by the other terminal is also similar. Also, on the basis of the route in which the overlap is inspected, the host terminal may be replaced by the different terminal.

The topology specifying process of the topology specifying section 5 will be described below in detail with reference to FIGS. 6 to 11B. The topology specifying section 5 uses the known topology 100, which includes the terminals A, B and C as shown in FIG. 4, and the unknown terminal D, and specifies the connection node between the unknown terminal D and the known topology from the overlap of the routes between the terminals. Here, the terminals 11, 12, 13 and 90 and the networks 21, 22 and 23 are assumed to be the terminals A, B, C and D and the networks a, b and c, respectively, and the switch 31 is assumed to be the switch SW. Then, the topology is specified.

In the known topology 100, a portion to which the terminal D is possibly connected is one of the networks a, b and c and the switch SW. The route through which two of the three terminals A to C are connected always passes through the three portions of the four portions of the networks a, b and c and the switch SW. At this time, as for the three terminals A to C, if there is no overlap between the route between the concerned two terminals and the route between the remaining terminal and the terminal D, a portion to which the terminal D is connected is limited to one. On the other hand, if there is an overlap between the two routes, at least two routes are known to pass through the known switch SW. For example, with reference to FIG. 6, the route BC between the terminal B and the terminal C passes through the three portions of the networks b, c and the switch SW, and does not pass through the network a. At this time, if there is no overlap between the route BC from the terminal B to the terminal C and the route AD between the remaining terminal A and the terminal D, a portion to which the terminal D is connected is limited to the network a. On the other hand, if there is an overlap between the route BC and the route AD, it is known that the route AD between the terminal A and the terminal D passes through at least the switch SW and that the terminal D is not connected to the network a. Similarly, when an overlap between the route AB between the terminal A and the terminal B and the route CD between the terminal C and the terminal D or an overlap between the route AC between the terminals A, C and the route BD between the terminal B and the terminal D is checked, the portion to which the terminal D is connected is known. In this way, when the terminal D is connected to one of the networks a, b and c, there is a non-overlap route set. Thus, by specifying the non-overlap route set, it is possible to specify the connection node to the terminal D. Also, when overlap is detected in all of the three route sets, the position to which the terminal D is connected is limited to the switch SW.

As mentioned above, the topology specifying section 5 specifies the connection node of the unknown terminal D to the known topology 100 in accordance with the route overlap determination result outputted from the route overlap determining section 4, and then determines a new topology.

Figure 9A:
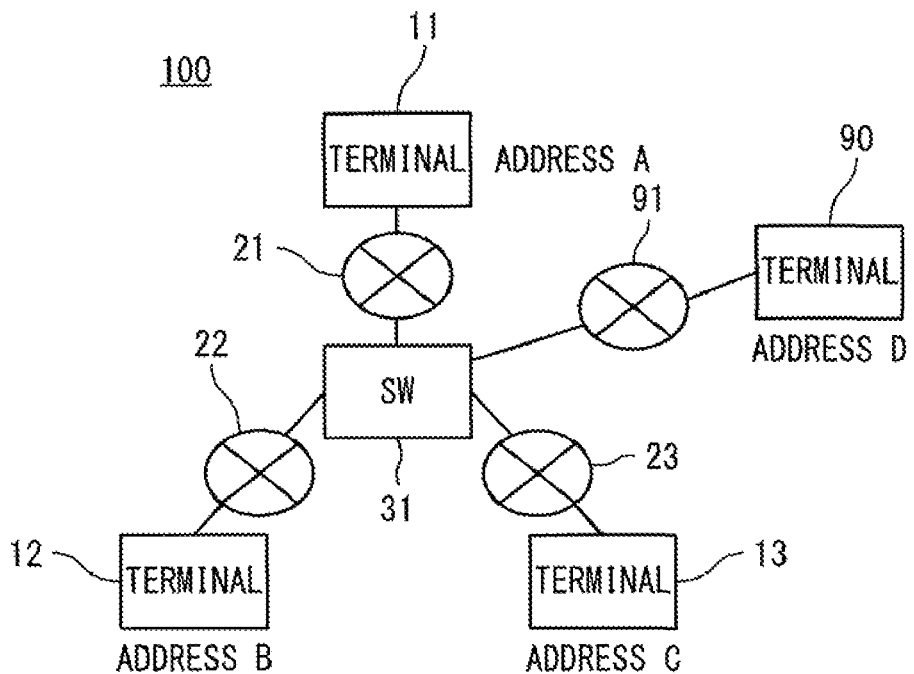
FIG. 9A is a diagram showing a topology in a case in which all of the route AD and the route BC, the route AC and the route BD, and the route AB and the route CD overlap.
Figure 9B:
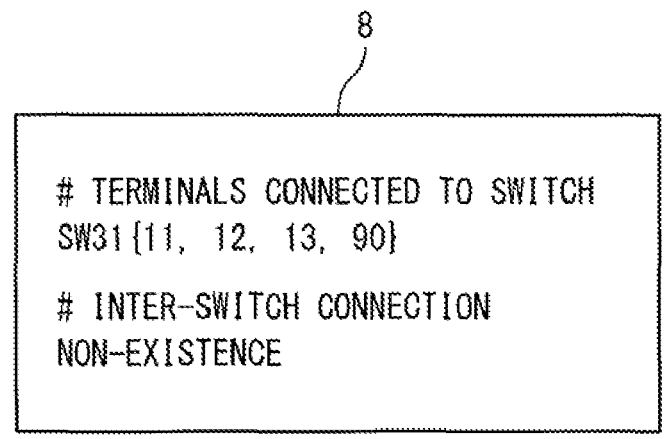
FIG. 9B is a diagram showing a topology file based on the topology shown in FIG. 9A.

For example, when it is determined that the route AD and the route BC overlap (refer to FIG. 6) and the route AC and the route BD overlap (refer to FIG. 7) and the route AB and the route CD overlap (refer to FIG. 8), the topology specifying section 5 specifies that the connection node of the unknown terminal 90 is the switch 31 and defines a topology to which the terminal 90 connected through a network 91 to the switch 31 is added, as a new known topology 100, and then updates the topology file 8 (refer to FIGS. 9A and 9B).

Figure 10:
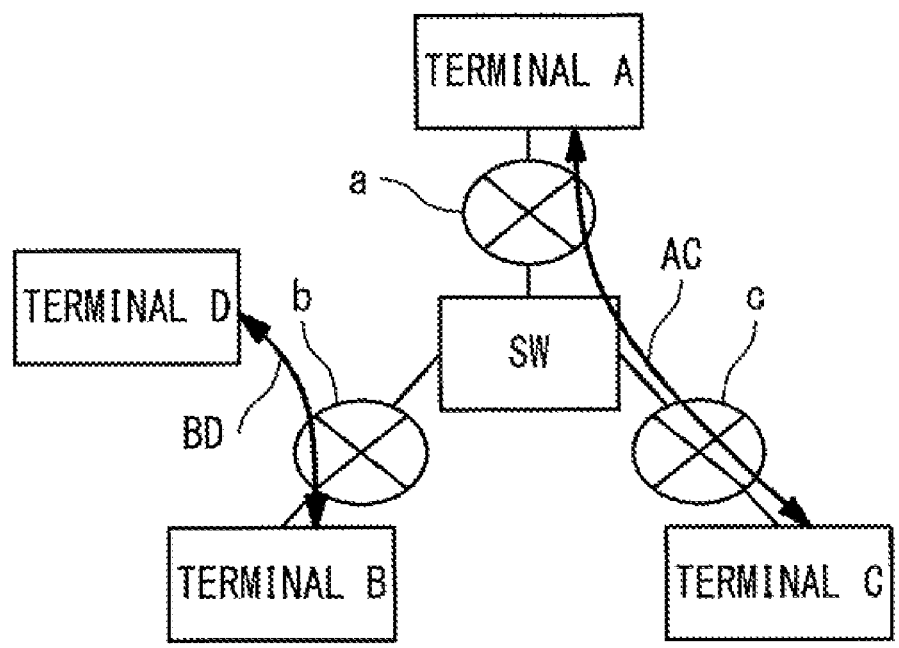
FIG. 10 is a diagram showing a case that the route AC and the route BD do not overlap.
Figure 11A:
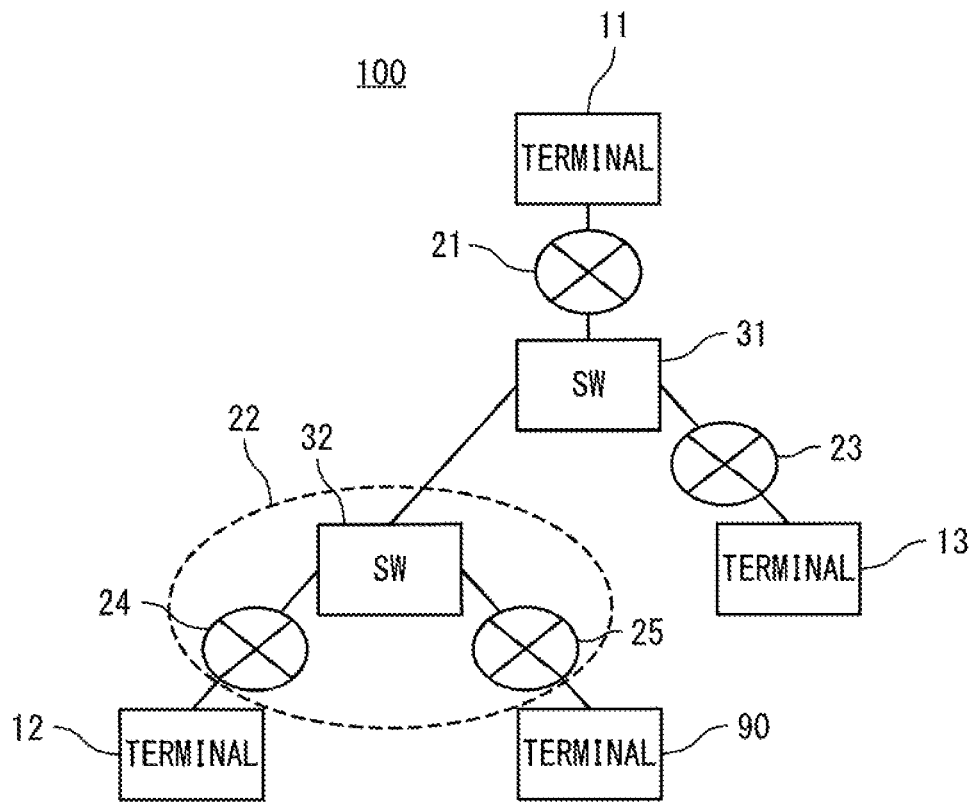
FIG. 11A is a diagram showing a topology that the route AD and the route BC, and the route AB and the route CD overlap, and the route AC and the route BD do not overlap.
Figure 11B:
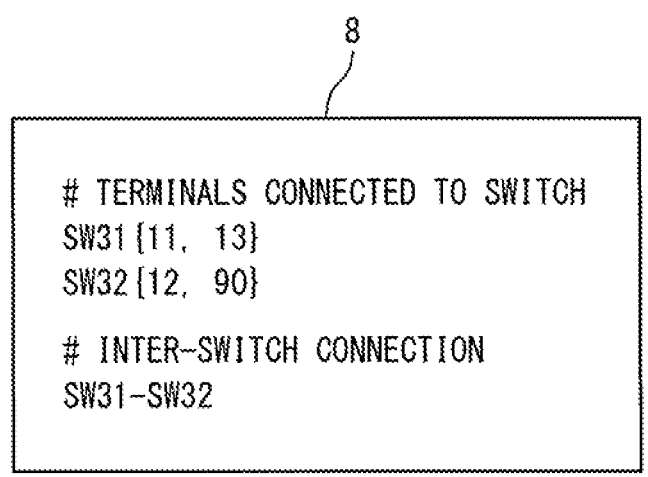
FIG. 11B is a diagram showing the topology file based on the topology shown in FIG. 11A.

On the other hand, when there is the route set in which the routes do not overlap, for example, when the route AC and the route BD do not overlap as shown in FIG. 10, the topology specifying section 5 determines that the known switch SW does not exist on the route BD and specifies that the unknown terminal D is connected in the direction from the switch SW to the terminal B. Also, the route BD is specified to pass through the switch in the network b. For this reason, the topology specifying section 5 specifies that the network 22 includes networks 24 and 25 and a switch 32 connected to the switch 31. Also, the topology in which the terminals 12 and 90 are connected through the networks 24 and 25 to the switch 32, respectively, is assumed to be the known topology 100, and the topology file 8 is updated (refer to FIGS. 11A and 11B).

Even if there is no overlap in the route sets other than the exemplified route set, it is similarly possible to specify the connection node of the unknown terminal 90.

As mentioned above, according to the present invention, by using a MAC address learning function that is typically used in the switch, it is possible to specify the connection node between the unknown terminal 90 and the known topology 100. For this reason, even in the network that includes the conventionally-used switch, especially a switch which is cheap and does not have many functions, the topology can be specified. Since containing the topology specifying apparatus 10, the terminal in the network can specify the topology even from any terminal.

Also, even if the number of terminals of the network is four or more, the topology of the four terminals can be acquired as mentioned above. Thus, the repetition of the similar operation allows the topology, which includes all of the terminals, to be specified. A method of determining a connection node of an unknown terminal D (not shown) to the known topology 100 having the four known terminals (for example, the known topology 100 shown in FIG. 11A) will be described below. Here, it is supposed that a terminal set in a known topology is U, and a known switch set is S. In this case, the known terminal set U includes the terminals 11, 12, 13 and 90, and the known switch set S includes the switches 31 and 32.

The operation of the terminal which specifies the topology will be described below. At first, the topology in which a latent switch is supposed for all of the known connections is generated. Next, a set of routes for every two of all the terminals including the unknown terminal D is selected, and the overlap between those routes is check. In the case of the above-mentioned method, the three terminals A, B and C are extracted from the four terminals 11, 12, 13 and 90, and each of the overlap between the route AB and the route CD, the overlap between the route AC and the route BD, and the overlap between the route BC and the route AD is checked. This is checked for all of the patterns. For example, at first, the terminals 11, 12 and 13 are assumed to be the terminals A, B and C, respectively. Then, the overlap between the route AB and the route CD, the overlap between the route AC and the route BD, and the overlap between the route BC and the route AD are checked as mentioned above. In succession, in the case that the terminals 12, 13 and 90 are assumed to be the terminals A, B and C, respectively, and the case that the terminals 13, 90 and 11 are assumed to be the terminals A, B and C, respectively, and the case in which the terminals 90, 11 and 12 are assumed to be the terminals A, B and C, respectively, the overlap between the route AB and the route CD, and the overlap between the route AC and the route BD, and the overlap between the route BC and the route AD are similarly checked. Consequently, it is possible to check all of the patterns of the overlap between the route between the known terminals and the route between the known terminal and the unknown terminal.

If the route AB and the route CD do not overlap, the switch to which the unknown terminal D is connected is determined not to be included in the route AB. However, there is a possibility that the switch itself to which the terminal D is connected is unknown. Thus, the latent switch is supposed for all of the known connections, and the check is performed. The similar determination is performed on the route AC and the route BD, and the route BC and the route AD.

Here, a set of the known switch S and the latent switch is defined as a candidate set CSWD. When there is no overlap between the checked routes, the known switch and the latent switch, which are included in the route to the unknown terminal D as a check target, are removed from the candidate set CSWD. This is performed on the patterns of all of the route sets, and the switch remaining in the candidate set CSWD is determined to be the switch connected to the terminal D. At this time, when the switch connected to the terminal D is the latent switch, it is added as the new switch to the known topology 100.

As mentioned above, even if the number of terminals in the known topology 100 is four or more, the connection portion of the unknown terminal can be specified, thereby determining the new topology.

2. Second Exemplary Embodiment

The second exemplary embodiment will be described below with reference to FIGS. 12 to 22. The second exemplary embodiment indicates a method that can reduce the number of times of the check that the inter-terminal route passes through the same switch, as compared with the first exemplary embodiment. Here, in the known topology 100 and the unknown terminal D shown in FIG. 14, when one measurement terminal T serves as a sending base point of a measurement packet, to determine a connection direction of the unknown terminal D from a switch SWi in the remarked network.

Figure 13A:
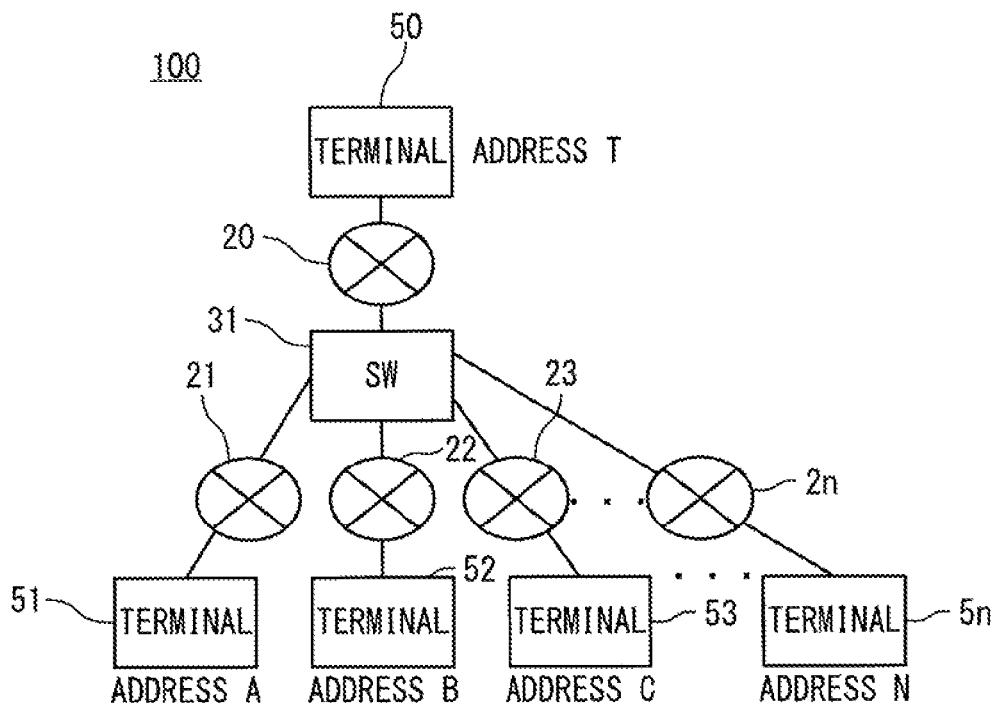
FIG. 13A is a diagram showing a known topology that is used for topology specification in the second exemplary embodiment.

In the second exemplary embodiment, a method of determining a topology, which is provided with n terminals 51 to 5n and a measurement terminal 50 included in LAN and a terminal 90, will be described as one example. Here, the description is given under the assumption that the topology of the network, which includes the measurement terminal 50 and the terminals 51 to 5n as shown in FIG. 13A, is defined as the known topology 100, and that the unknown terminal whose connection relation to the known topology 100 is not specified is defined as the terminal 90. With reference to FIG. 13A, the measurement terminal 50 and the terminals 51 to 5n are connected to the switch 31 through a network 20 and networks 21 to 2n, respectively. Also, the known topology 100 is a tree type topology in which a parent is the measurement terminal 50, and the terminals 51 to 5n are arbitrary terminals among descendent terminals that are connected to the ends of the networks 21 to 2n, respectively. It should be noted that only one switch 31 in which the terminals are connected to the different interfaces can exist in the tree network. Also, the switch 31 is assumed to be related to the terminals and the MAC addresses in advance and the terminals can communicate with each other.

Figure 12:
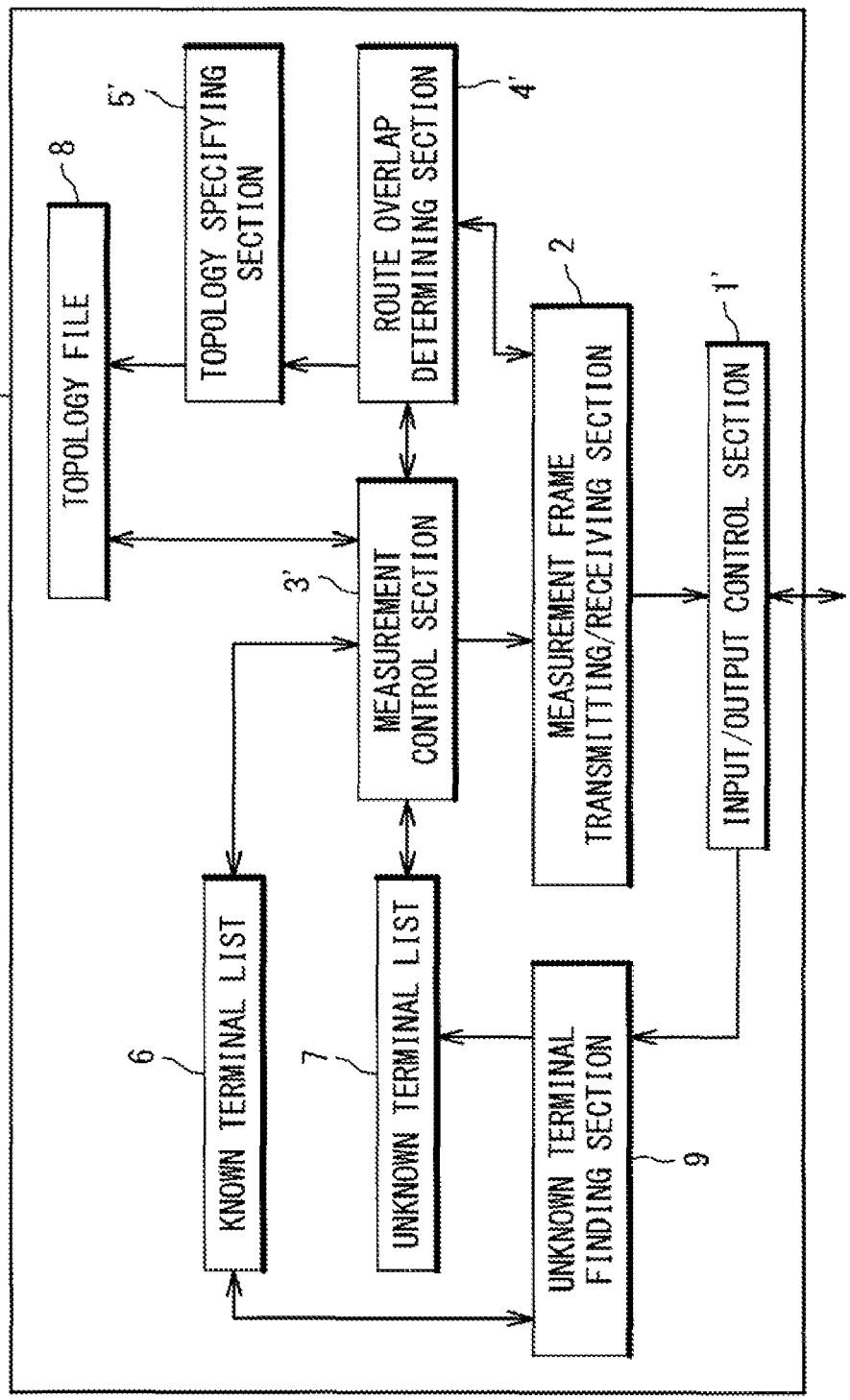
FIG. 12 is a block diagram showing a configuration of the topology specifying apparatus according to a second exemplary embodiment of the present invention.

The measurement terminal 50 according to the present invention contains a topology specifying apparatus 10' shown in FIG. 12. The topology specifying apparatus 10' contains an input/output control section 1', the measurement frame transmitting/receiving section 2, a measurement control section 3', a route overlap determining section 4', the topology specifying section 5' and an unknown terminal finding section 9. Also, the topology specifying apparatus 10' contains a storing unit (not shown) in which the known terminal list 6, the unknown terminal list 7 and the topology file 8 are stored.

The input/output control section 1' controls the network and the input and output of the frame/packet. Also, the input/output control section 1' in the second exemplary embodiment passes a replica of the frame, which is supplied from an external terminal, to the unknown terminal finding section 9. The unknown terminal finding section 9 refers to a transmission source address of the packet passed by the input/output control section 1'. When the terminal does not exist in the known terminal list 6, the unknown terminal finding section 9 registers the terminal in the unknown terminal list 7. The measurement frame transmitting/receiving section 2 generates the measurement frame to check the overlap between the routes and carries out the transmission and reception of the frame. The measurement control section 3' manages a measurement procedure that will be described later, and instructs the transmission of the frame to the other measurement terminals and report of the reception result. The route overlap determining section 4' determines the overlap between the routes in accordance with the reception states of the measurement frame. The topology specifying section 5 determines the topology from the overlap between the routes and updates the known topology 100 written in the topology file 8.

Figure 13B:
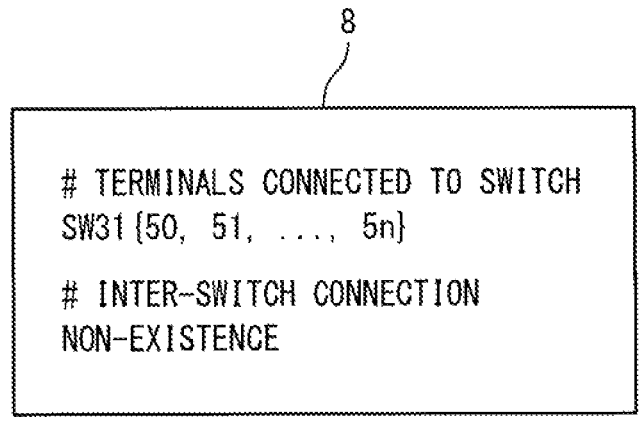
FIG. 13B is a diagram showing the topology file based on the topology shown in FIG. 13A.

The list of the known terminals and switches that are included in the known topology 100 is recorded in the known terminal list 6. Here, the terminals 11, 12 and 13 and the switch 31 are recorded in the known terminal list 6. The list of terminals each having unknown connection nodes although their existence in the network is known is recorded in the unknown terminal list 7. The input/output control section 1' in the second exemplary embodiment transfers the received frame to the unknown terminal finding section 9. The unknown terminal finding section 9 refers to the known terminal list 6, and when receiving the frame from the terminal that is not registered therein, adds the address of the terminal to the unknown terminal list 7. In this example, it is assumed that the terminal 90 is registered as the unknown terminal in the unknown terminal list 7. The known topology 100 is recorded in the topology file 8. Here, as the topology file 8, the configuration members representative of the known topology 100 shown in FIG. 13A and the connection relation between the configuration members are recorded as shown in FIG. 13B. For example, the names of the connected terminals for each switch and the connection state between the switches (the existence or non-existence of the connection between the switches and a name of the connected switch) are recorded in the topology file 8.

Also, the terminals 51 to 5n other than the measurement terminal 50 in this exemplary embodiment are assumed to attain a process for discarding a certain frame or a PING server process for returning a response to a transmission source.

The topology specifying method according to the present invention will be described below. Hereinafter, for the sake of convenience, it is assumed that the addresses (IP addresses, MAC addresses) of the terminals 51, 52 and 53 are defined as A, B and C, and the address of the terminal 5n is defined as N. Also, it is assumed that the terminals 51, 52, 53, ..., 5n are registered as 51, 52, 53, ..., 5n in the known terminal list 6 in the terminal 50, respectively.

Figure 14:
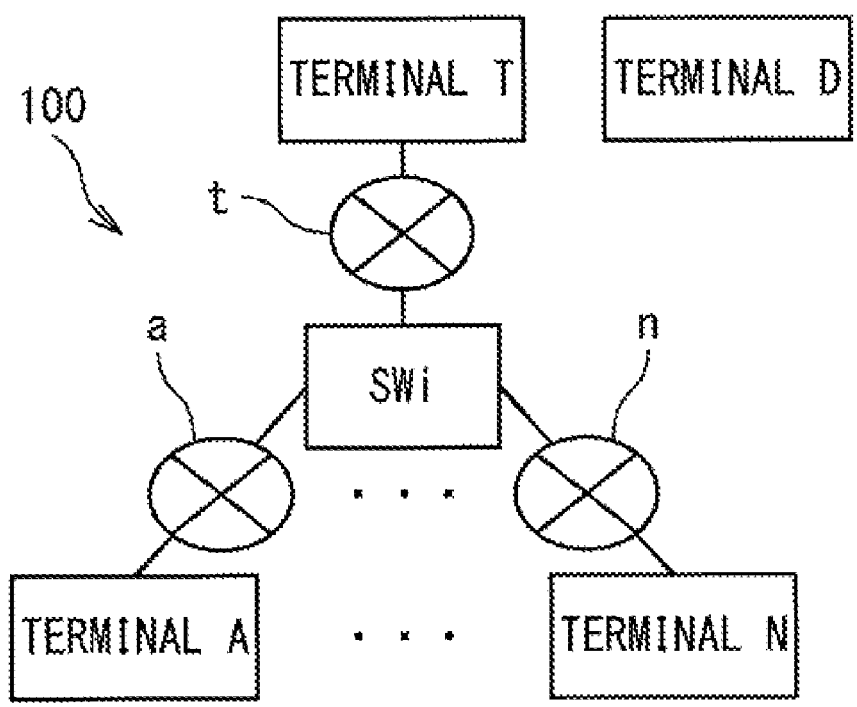
FIG. 14 is a diagram showing a known topology and a terminal whose connection position is unknown which are used to specify the topology in the second exemplary embodiment.

The outline of the topology specifying method in the second exemplary embodiment will be described below with reference to FIG. 3 and FIG. 14. At first, as shown in FIG. 14, the measurement terminal 50 determines a tree type topology as the known topology 100 in which includes a measurement terminal T as a parent and includes the terminals A, B, C, ..., N connected to a switch SWi serving as the child of the measurement terminal T, (Steps S101 and S102). Next, the known topology 100 and the terminal D having an unknown connection node are extracted the connection node between the unknown terminal D and the known topology is specified in accordance with the existence or non-existence of overlap between the route between optional terminals in the known topology 100 and a route TD between the measurement terminal T and the unknown terminal D (Steps S103 to S106).

The process of determining the known topology at the steps S101 and S102 will be described below. The measurement control section 3' pays attention to the switch SWi serving as the child of the measurement terminal T, in the tree topology that the measurement terminal T is parent. The measurement control section 3' stores the measurement terminal T as the parent of the switch SWi. For example, the measurement control section 3' pays attention to the switch 31 and stores the measurement terminal 50 as the parent of the switch 31. Next, the measurement control section 3' refers to the topology file 8 and picks up the terminals and the switches, which are directly connected to the switch 31 (as the children) except the parent, and then stores as a set. Here, when the switch is included in the set, the measurement control section 3' retrieves the terminals serving as the descendants from the topology file 8 and replaces the switches in the set with the terminals serving as the descendants. Here, the terminals 51 to 5n shown in FIG. 13A are registered as the set (the terminals A to N). As mentioned above, the measurement terminal 50 determines the known topology 100 in which the measurement terminal 50 is the terminal T, the terminals 51, 52, 53, ..., 5n and 90 are the terminals A, B, C, N, the network 20 is a network t, the networks 21, 22, 23, ..., 2n are the networks a, b, c, ..., n, and the switch 31 is the switch SWi.

Next, the measurement terminal 50 extracts the terminal D having an unknown connection node (Step S103). In detail, the measurement control section 3' determines whether or not a data of any terminal is stored in the unknown terminal list 7, and if it is stored, the unknown terminal is extracted (Step S103). Here, if the data of the terminal is not stored in the unknown terminal list 7, the control flow is ended. In this exemplary embodiment, since the terminal 90 exists in the unknown terminal list 7, the terminal 90 is selected as the unknown terminal D. The topology specifying section 5' refers to the set of the terminals in the known topology 100, and if the set is constituted by one terminal, the terminal 90 is determined to be the child connected to the switch 31, and the terminal 90 is added to the list of terminals connected to the switch 31 in a topology file, and the control flow is ended. If the two or more terminals exist in the set, the control flow proceeds to a step S104.

The measurement terminal 50 specifies a connection node between the unknown terminal D and the known topology in accordance with the existence or non-existence of the overlap between the routes in the known topology 100 and the unknown terminal D (Steps S104 to S106). At the step S104, the measurement control section 3' selects the route TD between the measurement terminal T and the terminal D and the route between two optional terminals in the set (the terminals A to N), and instructs the route overlap determining section 4' to check the overlap between these two routes. Here, the route overlap between the route TD between the measurement terminal 50 and the terminal 90 and the route between the two optional terminals among the terminals 51 to 5n is checked.

Figure 15:
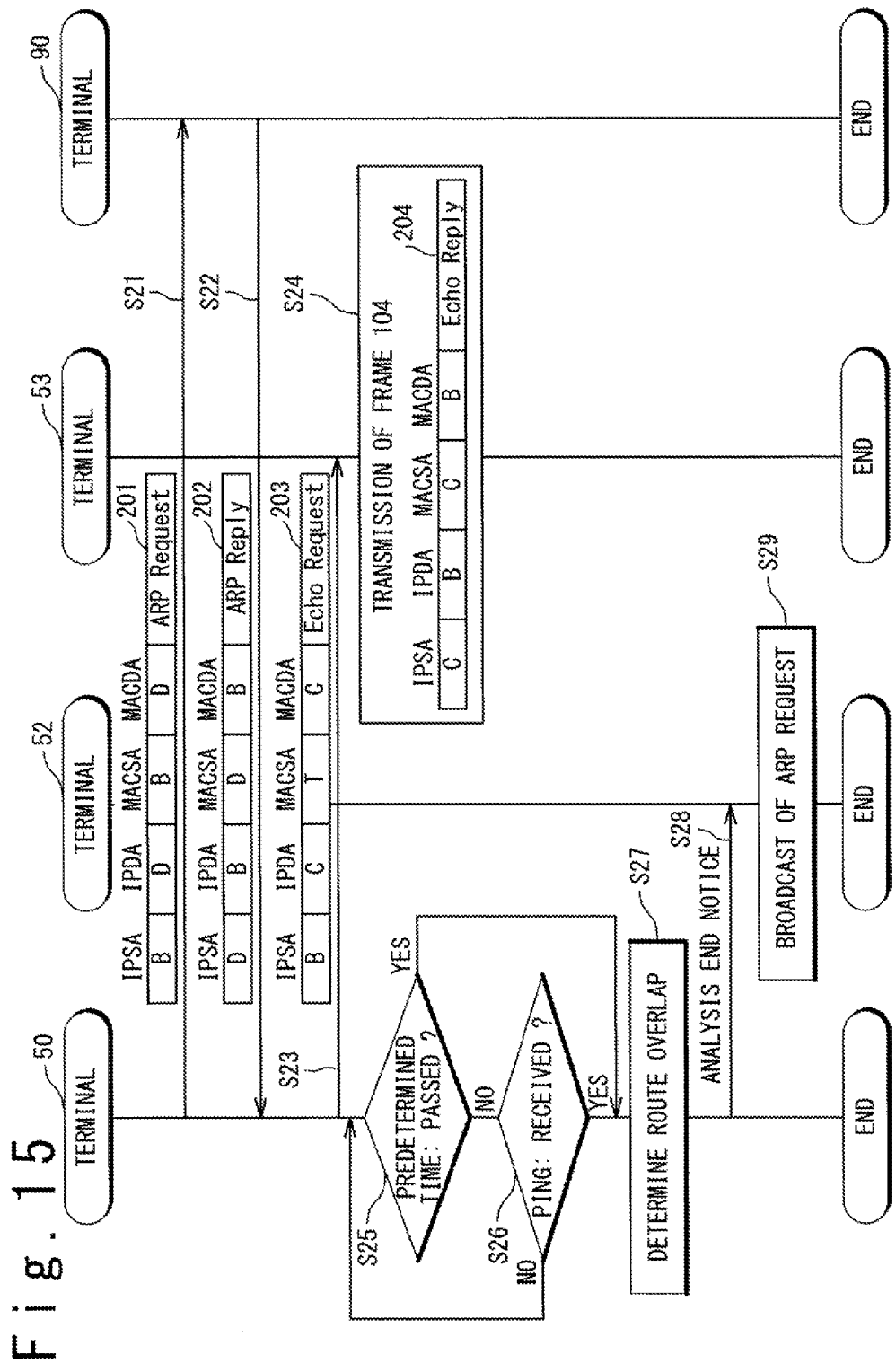
FIG. 15 is a sequence diagram showing an operation of checking the overlap state between the routes in the network according to the second exemplary embodiment of the present invention.
Figure 16:
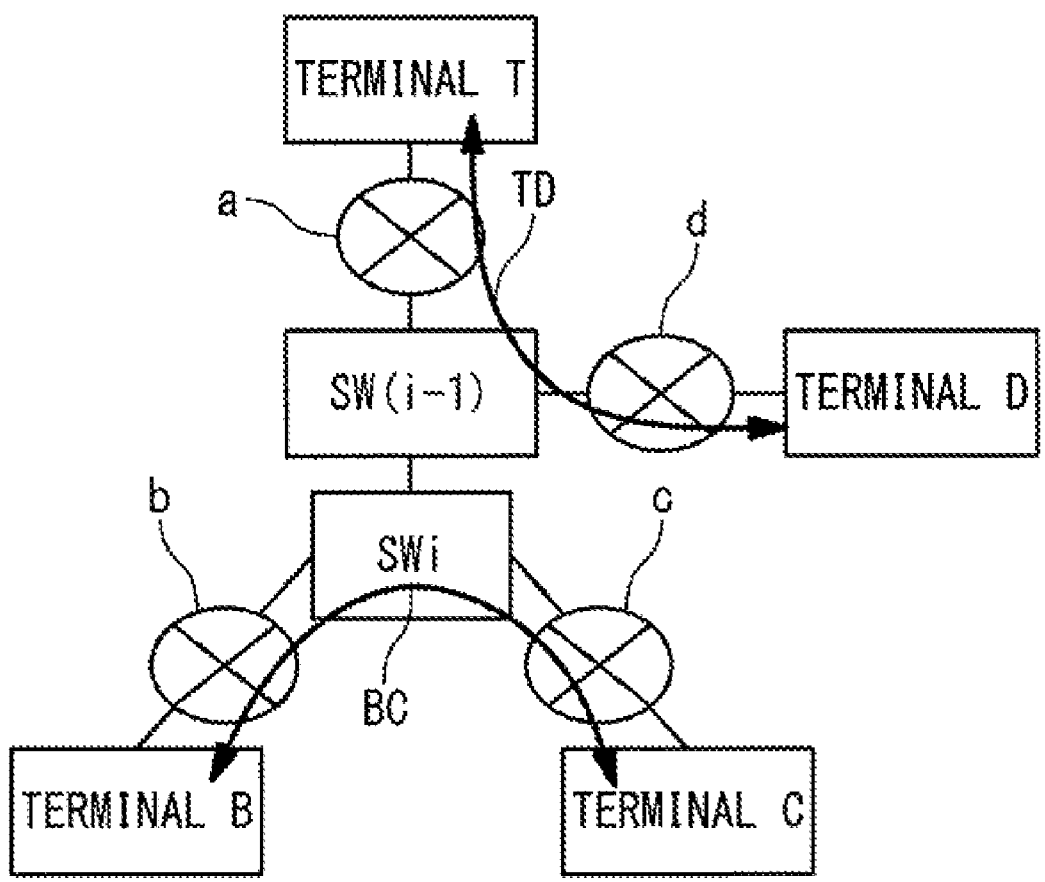
FIG. 16 is a diagram showing a case that a route TD and a route BC do not overlap.

With reference to FIGS. 14 to 22, the overlap determining process between the routes in the second exemplary embodiment will be described below in detail. Here, the operation of determining the overlap between the route TD between the terminal 50 and the terminal 90 and the route BC between the terminal 52 and the terminal 53 will be described. FIG. 15 is a sequence diagram showing the operation of the overlap determining process between the route TD and the route BC in the second exemplary embodiment.

The topology specifying method in the second exemplary embodiment instructs the switch on the route TD to learn the MAC address for measurement in accordance with the control by the measurement terminal 50. In this state, the measurement terminal 50 issues a PING request for making a receiver return a PING to another terminal 52, to the terminal 53 in the set. Then, the existence or non-existence of the overlap between the route TD and the route BC is determined on the basis of the reception state of the PING in the measurement terminal 50. This will be described below in detail.

With reference to FIG. 15, the route overlap determining section 4' in the terminal 50 requests a measurement frame transmitting/receiving section 2 to transmit a measurement frame 201 to the terminal 90 (Step S21). Here, the frame 201 is a frame including a unicast ARP request, and the address B of the terminal 52 is set as a transmission source address (IP address, MAC address), and the address D of the terminal 90 is set as the destination address (IP address, MAC address). Consequently, when the switch exists on the route TD from the terminal 50 to the terminal 90, the switch learns to transfer the frame having the terminal 52 (address B) as the destination into the direction of the terminal 50. After receiving the frame 201, the terminal 90 returns a frame 202 having an address of the terminal 52 as a destination address (Step S22). It should be noted that the terminal 90 discards this frame, after receiving the frame 201.

Next, the route overlap determining section 4' in the terminal 50 sends a frame 203 to the terminal 53 as the PING request (Step S23). The frame 203 is a frame including an ICMP (Internet Control Message Protocol) Echo request. The address B of the terminal 52 is set as a transmission source IP address, the address T of the measurement terminal 50 is set as a transmission source MAC address, and the address C of the terminal 53 is set as a destination address (IP address, MAC address). The terminal 53 replies a PING reply in response to the PING request based on the frame 203 (Step S24). At this time, the terminal 53 recognizes that the received PING request is transmitted by the terminal 52 and sends a frame 204 as the PING reply to the terminal 52. That is, the frame 204 includes an ICMP Echo reply. Then, the address C of the terminal 53 is set as the transmission source address (IP address, MAC address), and the address B of the terminal 52 is set as the destination address (IP address, MAC address).

The measurement terminal 50 waits for the reception of the frame 204 within a predetermined time period after the step S23 (Step S25 No, S26). On the basis of whether or not the frame 204 has been received within this time period, the route overlap determining section 4' determines whether or not the route TD and the route BC overlap (Step S27). If the frame 204 is received within the predetermined time period (Step S25 No, S26 Yes), the frame 204 addressed to the terminal 52 indicates that it passes through the switch in which the MAC address on the route TD has been changed. In this case, the route overlap determining section 4' determines that the route TD and the route BC overlap. If the frame 204 is not received within the predetermined time period (Step S25 Yes), the route overlap determining section 4' determines that the route TD and the route BC do not overlap. It should be noted that when a possibility that the frame is lost in the network is considered, an exemplary embodiment in which a plurality of frames 203 are sent by the terminal 50 is possible. Also, there is a possibility that the learning state of the MAC address is changed by frames except the measurement frame. Thus, a method that repeats the overlap determination plural times and employs the measurement result only when the same result is acquired is possible.

When the overlap determining process has been ended, the measurement terminal 50 issues an analysis end notice to the terminal 52 (Step S28). The terminal 52 broadcasts a frame, which includes the ARP request, to the terminals 51 to 5*n* and 90 and then returns the MAC address table of the switches between them to a normal transfer mode (Step S29). It should be noted that the destination terminal of the analysis end notice is not limited to the terminal 52, in the case of the terminal except the terminal 53.

Figure 17A:
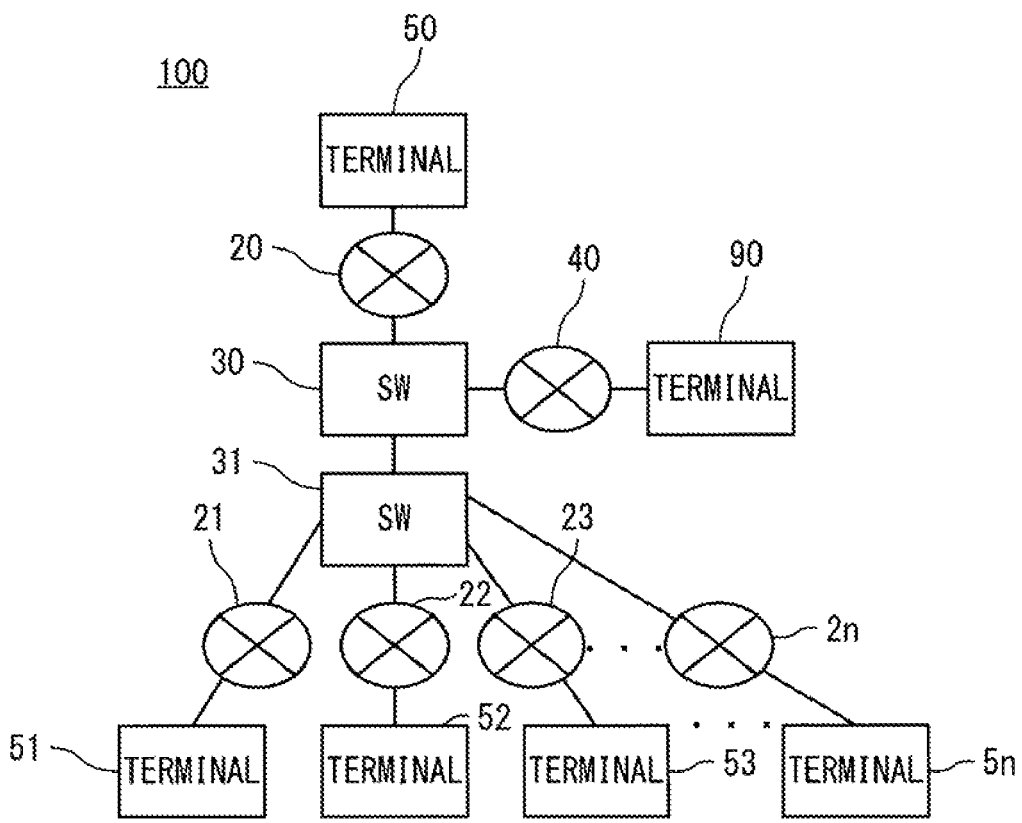
FIG. 17A is a diagram showing a topology in a case that the route TD and the route BC do not overlap.
Figure 17B:
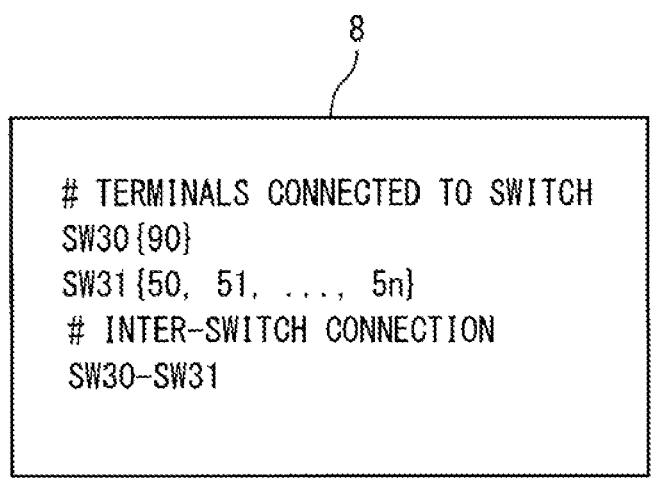
FIG. 17B is a diagram showing the topology file based on the topology shown in FIG. 17A.

As mentioned above, the route overlap determining section 4' in the second exemplary embodiment can determine the existence or non-existence of the overlap between the route TD between it and the unknown terminal and the route between two optional terminals in the known topology 100. Here, with reference to FIG. 14, a set (of the terminals A to N) is the descendants of the switch SWi, and each of them is connected through the different network to the switch SWi. For this reason, the route between the two optional terminals in the terminals A to N always passes the switch SWi and does not pass through the network t in the parent direction when it is diagramed from the switch SWi. For this reason, if the route between the two optional terminals of the terminals A to N and the route TD do not overlap, the topology specifying section 5' determines that the terminal D is not a child of the switch SWi and this is a child of a switch SW(i−1) newly added between the parent (measurement terminal 50) and the switch SWi. In this case, the topology specifying section 5' installs a new switch 30 between the network 20 and the switch 31, as shown in FIG. 17A, and the topology in which the terminal 90 is connected through a network 40 to the switch 30 is registered as the new known topology 100. The topology file 8 at this time is updated as shown in FIG. 17B.

On the other hand, if the route TD and the route BC are determined to overlap, the control flow returns to the step S104, and the routes for the overlap determination are selected again. At this time, the route overlap determining section 4' selects two of a terminal K and a terminal L from the terminals 51 to 5*n* and determines the existence or non-existence of the overlap between a route KD between the terminal K and the unknown terminal D and a route TL between the measurement terminal T and the terminal L. For example, the terminal 52 is selected as the terminal K, and the terminal 53 is selected as the terminal L.

The measurement terminal 50 checks the overlap between the route KD and the route TL, similarly to the steps S21 to S29. At this time, the frame 201 is sent to the terminal 53. Then, when the switch exists on the route TL, the switch is made to learn to transfer the frame addressed to the terminal 52 to the measurement terminal 50. Also, the measurement terminal 50 transmits the PING request (the frame 203 having the address D as a destination address) to the unknown terminal 90 and checks the overlap between the route KD and the route TL in accordance with the existence or non-existence of the reception of the PING reply from the terminal 90.

Figure 18:
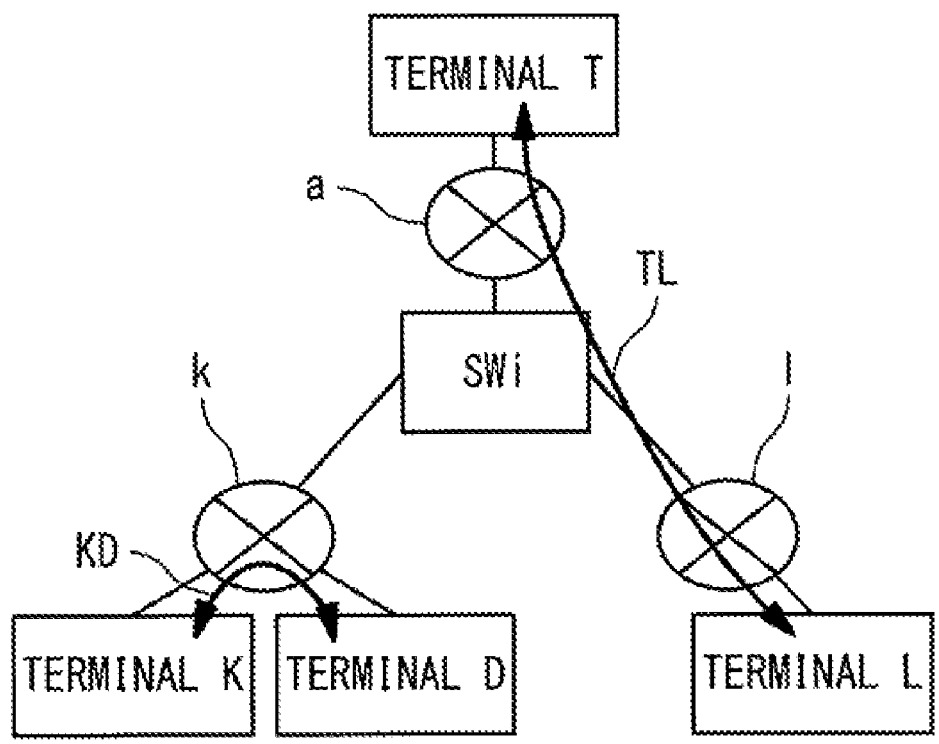
FIG. 18 is a diagram showing a case that a route TL and a route KD do not overlap.
Figure 19A:
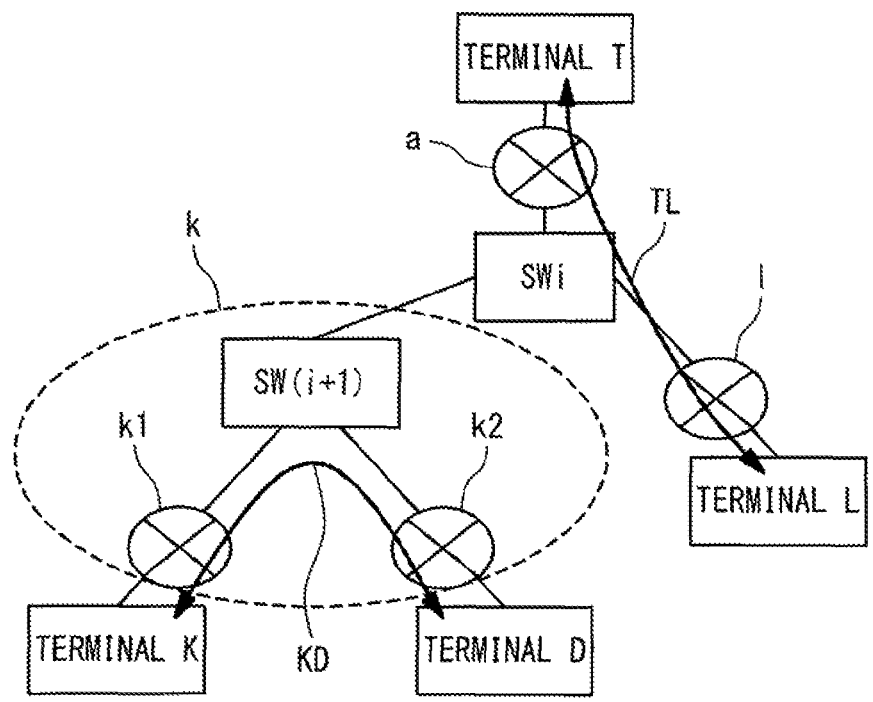
FIG. 19A is a diagram showing a topology of a case in which the route TL and the route KD do not overlap.
Figure 20A:
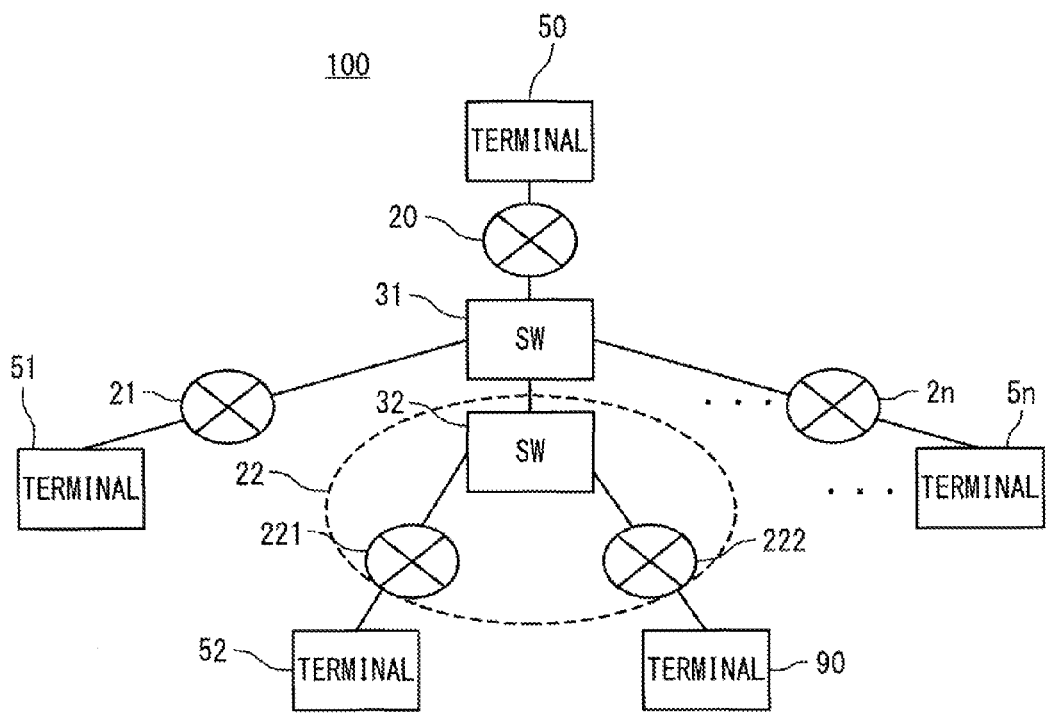
FIG. 20A is a diagram showing a topology in a case that the route TL and the route KD do not overlap.
Figure 20B:
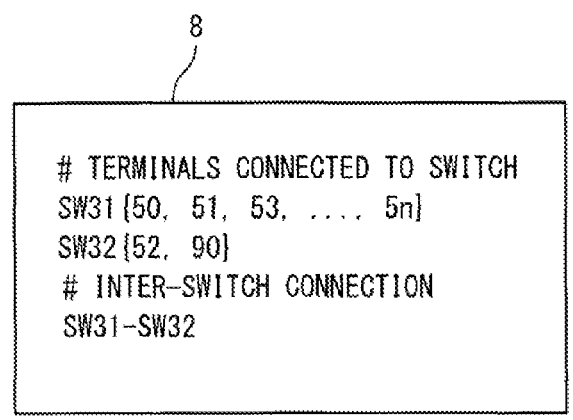
FIG. 20B is a diagram showing the topology file based on the topology shown in FIG. 20A.

Here, if the route KD and the route TL are determined not to overlap, the topology specifying section 5' determines that as shown in FIG. 18, the terminal D (50) is connected to the switch SWi (31) through the network k in the same direction as the terminal K (52). Also, if the terminal K (52) is a child directly connected to the switch in the network k, as shown in FIG. 19A, a switch SW(i+1) is added in the network k, and the terminal K (52) and the terminal D (90) are connected as the children of the switch SW(i+1), and the known topology 100 is updated. In this case, in addition to the switch SW(i+1), a network k1 through which the switch SW(i+1) and the terminal K (52) are connected and a network k2 through which the switch SW(i+1) and the terminal D (90) are connected are added to the network k. With reference to FIGS. 20A and 20B, in such a case, a switch 32 connected to the switch 31 is added to the known topology 100. That is, the known topology 100 and the topology file 8 are updated that the terminals 52 and 90 are connected to the switch 32 corresponding to the switch SW(i+1) through networks 221 and 222 corresponding to the networks k1 and k2, respectively.

On the other hand, if the terminal K (52) is not the child directly connected to the switch in the network k, the measurement control section 3' stores the switch SWi as the parent, and stores the switch SW(i+1), which is connected as the child in the same direction as the terminal K (52) when it is diagramed from the switch SWi, as the switch that is newly remarked. Also, the measurement control section 3' stores the known terminal, which is connected as the child, for the switch SW(i+1), as the set (the terminals A to N). Hereinafter, the connection node of the unknown terminal D is specified similarly to the steps S103 to S106.

Figure 19B:
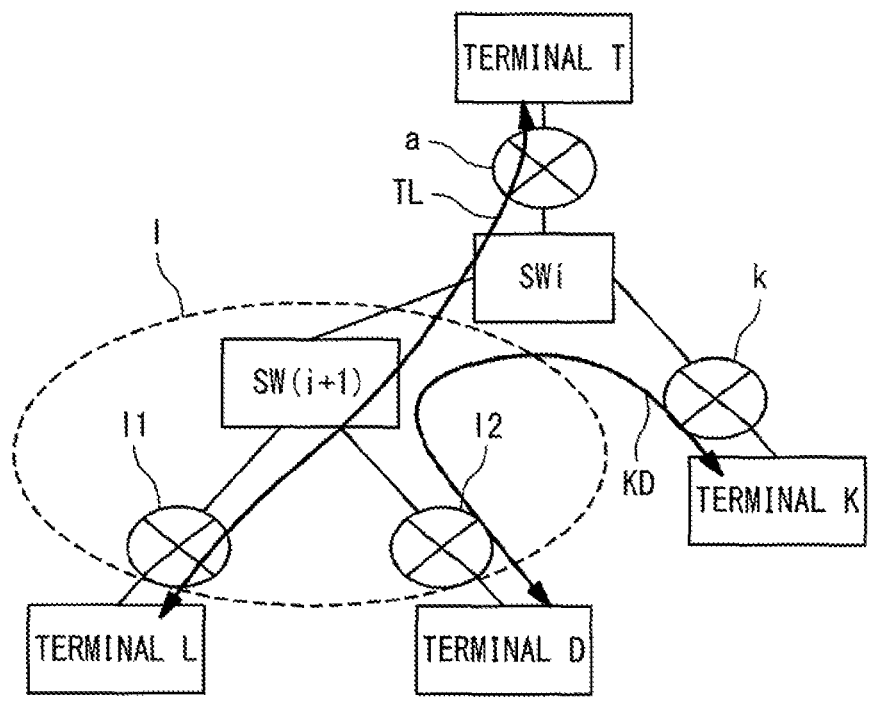
FIG. 19B is a diagram showing a topology in a case that the route TL and the route KD overlap.
Figure 21A:
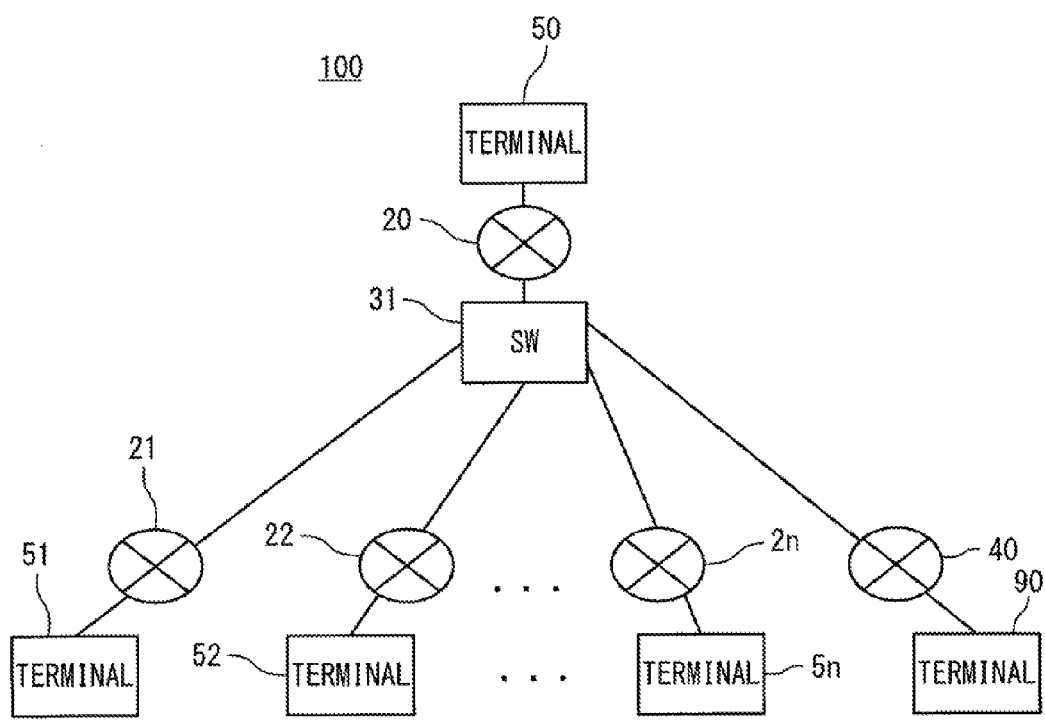
FIG. 21A is a diagram showing a topology in a case that all of the verified routes TL and routes KD overlap.
Figure 21B:
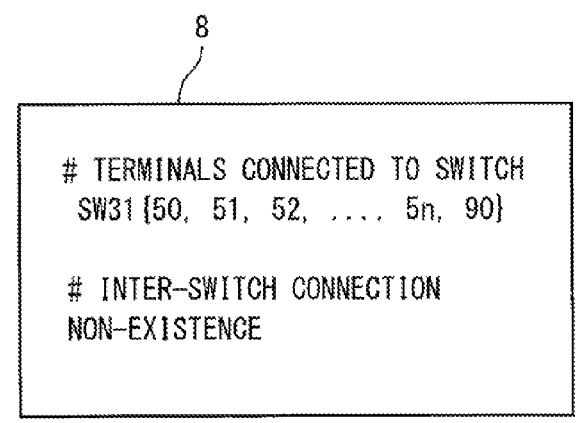
FIG. 21B is a diagram showing the topology file based on the topology shown in FIG. 21A.

Also, if the route KD and the route TL are determined to overlap, as shown in FIG. 19B, the terminal D (90) can be determined not to exist in the same direction as the terminal K (52) (not to be connected to the same network k). At this time, the measurement control section 3' adds the terminal 52, which is concerned as the terminal K, to an already concerned terminal list (not shown) and selects the new terminal K from the set (the terminals 51 to 5*n*). The new terminal K is a terminal other than the terminal L, and this is a terminal that does not exist in an already concerned list. Here, if the new terminal K is not selected, any terminal is selected as the new terminal L from the terminals other than the terminal L, and the existence or non-existence of the overlap between the route KD and the route TL is verified similarly to the above-mentioned case, and the topology is specified. Also, if the new terminal K is not selected and if the new terminal L is already selected, all of the verified routes KD and routes TL are known to overlap. For this reason, as shown in FIG. 21A, it is specified that the terminal 90 is connected as a child of the switch 31 through the unknown new network 40. The topology specifying section 5' updates the known topology 100 and the topology file 8 and ends the control flow, as shown in FIGS. 21A and 21B.

As mentioned above, according to the topology specifying method according to the second exemplary embodiment, the response of the PING is used to determine the overlap between the routes. Thus, the measurement terminal 50 can be used to specify the topology. Also, similarly to the first exemplary embodiment, a MAC address learning function of the switch is used to specify the topology. Therefore, the topology can be specified even in the network that includes the switch without any high level function.

The exemplary embodiments of the present invention have been detailed as mentioned above. However, the specific configuration is not limited to the above-mentioned exemplary embodiments. Even the change in the range without departing from the scope of the present invention is included in the present invention. In the first and second exemplary embodiments, the unicast ARP is used to check the overlap between the routes. However, it is not limited to this. For example, instead of the unicast ARP, any packet may be used to change the transferring destination of the switch on the route. However, when a possibility that the timeout of an ARP cash causes the transmission of an APR request or a possibility that the response of this reset packet or the like is carried out is considered, a method that carries out the MAC address learning by using the unicast ARP is preferable as described in the first and second exemplary embodiments. Also, in the second exemplary embodiment, in accordance with the response of the PING that uses ICMP Echo, the overlap between the routes is determined. However, it is not limited to this. As long as the response to the signal from the measurement terminal 50 is sent, a different protocol may be used. For example, at the step S23, the measurement terminal 50 may issue a connection creation request (SYN) in TCP (Transmission Control Protocol) instead of the frame 203 and judge the overlap between the routes in accordance with the reception state of the response (SYN ACK) from the terminal 53. Or, at the step S23, the measurement terminal 50 may transmit any frame and judge the existence or non-existence of the overlap between the routes in accordance with the reception state of the response frame executed by an ECHO server set for the terminal 53.

The invention claimed is:

1. A topology specifying method in a network having a tree type network topology, comprising:
    selecting a first route between a first terminal and a second terminal and a second route between a third terminal and a fourth terminal;
    determining a network topology based on existence or non-existence of an overlap of said first route and said second route;
    determining the existence or non-existence of the overlap of said first route and said second route,
    wherein said determining the existence or non-existence of said overlap comprises:
    controlling a switch on said second route to learn to transfer a frame destined to a predetermined terminal to said third terminal;
    transmitting a second frame having an address of said predetermined terminal as a transmission source address from said first terminal to said second terminal;
    transmitting a third frame destined to said predetermined terminal from said fourth terminal; and
    determining that said first route and said second route overlap when a receiving terminal of the third frame destined is said first terminal,
    wherein said determining the existence or non-existence of said overlap comprises:
    controlling the switch on said second route to learn to transfer the frame destined to said third terminal to said third terminal;
    transmitting the second frame having an address of said third terminal as the transmission source address from said first terminal to said second terminal;
    transmitting the third frame destined to said third terminal from said fourth terminal; and
    determining that said first route and said second route do not overlap when said first terminal receives the frame destined to said third terminal.

2. A topology specifying method in a network having a tree type network topology, comprising:
    selecting a first route between a first terminal and a second terminal and a second route between a third terminal and a fourth terminal;
    determining a network topology based on existence or non-existence of an overlap of said first route and said second route;
    determining the existence or non-existence of the overlap of said first route and said second route,
    wherein said determining the existence or non-existence of said overlap comprises:
    controlling a switch on said second route to learn to transfer a frame destined to a predetermined terminal to said third terminal;
    transmitting a second frame having an address of said predetermined terminal as a transmission source address from said first terminal to said second terminal;
    transmitting a third frame destined to said predetermined terminal from said fourth terminal; and
    determining that said first route and said second route overlap when a receiving terminal of the third frame destined is said first terminal,
    wherein said transmitting the third frame from said fourth terminal comprises:
    transmitting the third frame from said fourth terminal in response to a signal from said first terminal.

3. A topology specifying method in a network having a tree type network topology, comprising:

selecting by a processor, a first route between a first terminal and a second terminal and a second route between a third terminal and a fourth terminal; and determining a network topology based on existence or non-existence of an overlap of said first route and said second route, wherein said selecting said first route and said second route comprises:

selecting a known network topology which comprises said first terminal, said third terminal, and said fourth terminal; and extracting said second terminal having an unknown connection position with said known network topology as an unknown terminal, and wherein said determining a network topology comprises:

specifying the connection position of said unknown terminal with said known network topology based on the existence or non-existence of the overlap of said first route and said second route, wherein said first terminal, said third terminal, and said fourth terminal are connected with a first switch through different networks in said known network topology, respectively, and wherein said determining a network topology comprises:

specifying a network provided between said first switch and said unknown terminal based on the existence or non-existence of the overlap of said first route and said second route.

4. The topology specifying method according to claim 3, wherein said determining a network topology comprises:

determining that said unknown terminal is connected with said first switch through the network provided between said first switch and said first terminal when said first route and said second route do not overlap.

5. The topology specifying method according to claim 3, wherein said determining a network topology comprises:

determining that said unknown terminal is connected with said first switch through any of the networks other than the network provided between said first switch and said first terminal when said first route and said second route overlap.

6. The topology specifying method according to claim 3, wherein said determining a network topology comprises:

determining that said unknown terminal is connected with said first switch through a new network when said unknown terminal is determined not to be connected with any of the networks connected with said first switch in said known network topology.

7. A topology specifying apparatus in a network having a tree type network topology, comprising:

a route overla determinin, section confi ured to determine existence or non-existence of an overlap between a first route between a first terminal and a second terminal and a second route between a third terminal and a fourth terminal; and a topology specifying section configured to determine a network topology based on the existence or non-existence of the overlap of said first route and said second route, wherein said route overlap determining section selects a known network topology which comprises said first terminal said third terminal and said fourth terminal and extracts said second terminal having an unknown connection position with said known network topology as an unknown terminal, said topology specifying section specifies the connection position of said unknown terminal with said known network topology based on the existence or non-existence of the overlap of said first route and said second route, said first terminal, said third, and said fourth terminal are respectively connected with a first switch through different networks in said known network topology, and said topology specifying section specifies a network between said first switch and said unknown terminal based on the existence or non-existence of the overlap of said first route and said second route.

8. The topology specifying apparatus according to claim 7, wherein said topology specifying section determines that said unknown terminal is connected with said first switch through the network provided between said first switch and said first terminal, when said first route and said second route do not overlap.

9. The topology specifying apparatus according to claim 7, wherein said topology specifying section determines that said unknown terminal is connected with said first switch through any of the networks other than the network provided between said first switch and said first terminal, when said first route and said second route overlap.

10. The topology specifying apparatus according to claim 7, wherein said topology specifying section determines that said unknown terminal is connected with said first switch through a new network, when said unknown terminal is not connected with any networks connected with said first switch in said known network topology.

* * * * *